United States Patent
Watanabe et al.

(10) Patent No.: US 6,900,853 B2
(45) Date of Patent: May 31, 2005

(54) LIQUID CRYSTAL DISPLAY DEVICE AND MANUFACTURING METHOD THEREOF

(75) Inventors: Kunihiko Watanabe, Chiba (JP); Masahiro Ukisu, Mobara (JP); Tomoyuki Ariyoshi, Mobara (JP); Mitsuo Nakatani, Mobara (JP); Masahiko Suzuki, Mobara (JP); Hideki Kuriyama, Mobara (JP); Keiichiro Ashizawa, Mobara (JP)

(73) Assignee: Hitachi, Ltd., Tokyo (JP)

( * ) Notice: Subject to any disclaimer, the term of this patent is extended or adjusted under 35 U.S.C. 154(b) by 65 days.

(21) Appl. No.: 10/274,966

(22) Filed: Oct. 22, 2002

(65) Prior Publication Data

US 2003/0086041 A1 May 8, 2003

(30) Foreign Application Priority Data

Oct. 22, 2001 (JP) .................................... 2001-322951

(51) Int. Cl.$^7$ .......................... G02F 1/136; H01L 31/20; G09G 3/36
(52) U.S. Cl. .............................. 349/43; 257/59; 345/92
(58) Field of Search .............................. 340/43; 257/59, 257/72; 345/92

(56) References Cited

U.S. PATENT DOCUMENTS

| | | | | |
|---|---|---|---|---|
| 4,377,628 A | * | 3/1983 | Ishioka et al. ............. | 430/57.6 |
| 5,071,770 A | * | 12/1991 | Kolesar, Jr. ................. | 436/151 |
| 5,712,652 A | * | 1/1998 | Sato et al. ................... | 345/90 |
| 5,824,235 A | * | 10/1998 | Yamazaki et al. ............ | 216/23 |
| 5,831,701 A | * | 11/1998 | Matsuyama et al. ........ | 349/110 |
| 6,172,721 B1 | * | 1/2001 | Murade et al. ............... | 349/43 |
| 6,219,206 B1 | * | 4/2001 | Odai et al. ................... | 360/320 |
| 6,475,836 B1 | * | 11/2002 | Suzawa et al. ............ | 438/149 |
| 6,614,076 B2 | * | 9/2003 | Kawasaki et al. .......... | 257/350 |

FOREIGN PATENT DOCUMENTS

| DE | 003432029 A1 | * | 3/1986 |
|---|---|---|---|
| JP | 04069623 | * | 3/1992 |

* cited by examiner

Primary Examiner—Tarifur R. Chowdhury
Assistant Examiner—Hoan Chau Nguyen
(74) Attorney, Agent, or Firm—Reed Smith LLP; Stanley P. Fisher, Esq.; Juan Carlos A. Marquez, Esq.

(57) ABSTRACT

A liquid crystal display device is provided with a pair of substrates which are arranged to face each other in an opposed manner and a liquid crystal layer which is sandwiched between main surfaces of a pair of substrates. On the main surface of one of the pair of substrates which faces the liquid crystal layer, pixel regions including switching elements, pixel electrodes which are connected to the switching elements and a protective film which is disposed at liquid crystal layer side of the switching elements are formed. In such a liquid crystal device, the protective film is formed by laminating the plurality of material layers which include at least a first material layer and a second material layer which is arranged closer to the liquid crystal layer side than the first material layer. Further, the second material layer exhibits resistivity which is lower than resistivity of the first material layer and higher than resistivity of silicon or semiconductor layers which constitute channels of the switching elements. Due to such a constitution, the image retention which is generated on a display screen of the liquid crystal display device can be reduced.

9 Claims, 8 Drawing Sheets

LIQUID CRYSTAL DISPLAY DEVICE AND MANUFACTURING METHOD THEREOF

BACKGROUND OF THE INVENTION

1. Field of the Invention

The present invention relates to a liquid crystal display device and a manufacturing method thereof, and more particularly to the structure of a liquid crystal display panel (liquid crystal display element) suitable for removing undesired charge remaining on electrodes which apply an electric field to a liquid crystal layer thereof, for promptly changing over images on a display screen and for promptly erasing images at the time of completion of display operation and a method for manufacturing thereof.

2. Description of the Related Art

Liquid crystal display devices have been popularly used as display devices for personal computers, monitors, television sets and the like. The liquid crystal display device includes a liquid crystal display panel which is comprised of a pair of substrates, a liquid crystal layer sandwiched between a pair of substrates (a layer made of liquid crystal composition sealed between a pair of substrates), and a group of electrodes which are formed on a main surface of at least one of these pair of substrates which faces the liquid crystal layer in an opposed manner. The display operation of the liquid crystal display device is performed such that an electric field applied to (the inside of the liquid crystal layer by a group of electrodes is controlled in response to information to be displayed so as to modulate the light transmissivity of the liquid crystal layer. In the above-mentioned main surface of the substrate of the liquid crystal display panel, a region where the light transmissivity of the liquid crystal layer is modulated (a region where the display operation is performed) is referred to as a display screen, a display region or an effective display region.

The liquid crystal display device is classified into two types, that is, the active matrix type and the passive matrix type depending on the behavior of liquid crystal molecules in the inside of the above-mentioned liquid crystal layer during the display operation and the electrode structure in the inside of the above-mentioned liquid crystal display panel adapted to the behavior. The former liquid crystal display device is characterized in that an active element (switching element) is formed on each pixel which constitutes the display region. As such an active element, for example, a thin film transistor (TFT) or a thin film diode (TFD) is used.

An example of the active matrix type liquid crystal display device is explained in conjunction with an equivalent circuit diagram of a liquid crystal display device using thin film transistors shown in FIG. 15.

As shown in FIG. 15, on a display screen 50 (a region surrounded by a broken line) of the liquid crystal display device, a plurality of scanning signal lines 10 which extend in the x direction and are arranged in parallel in the y direction which intersects the x direction and a plurality of video signal lines (also referred to as "data lines") 12 which extend in the y direction and are arranged in parallel in the x direction are formed. Further, on the display screen 50, a plurality of thin film transistors TFT each of which is connected to one of a plurality of scanning signal lines 10 and one of video signal lines 12 are formed. A plurality of thin film transistors TFT are formed of so-called field effect type transistors which are switched in response to a voltage applied to gate electrodes, wherein one of a plurality of scanning signal lines 10 is connected to each gate electrode. One of a plurality of video signal lines 12 is connected to a drain electrode of each thin film transistor TFT, while a pixel electrode which applies an electric field to the liquid crystal layer is connected to a source electrode of each thin film transistor TFT. The pixel electrode is indicated as capacitance $C_{LC}$ by being coupled with a counter electrode (also referred to as a common electrode) which generates an electric field to be applied to the liquid crystal layer along with the pixel electrode. A video signal voltage Y1, Y2, Y3, ... Yend which is generated in response to an image to be displayed is supplied to a plurality of thin film transistors TFT (arranged in the y direction in FIG. 15) to which the video signal lines 12 are connected through the video signal lines 12, while each thin film transistor TFT supplies the above-mentioned video signal voltage X1R, X1G, X1B, ... XendB to the pixel electrode in accordance with the timing at which the scanning signal voltage Y1, Y2, Y3, ... Yend is applied to the gate electrode through one of the scanning signal lines 10. Accordingly, on the display screen 50 of the liquid crystal display device, the pixels PIX each of which includes one of the plurality of thin film transistors TFT and the capacitance $C_{LC}$ to which the video signal voltage is applied through the thin film transistor TFT are formed two-dimensionally. Here, as described above, as viewed from the gate electrode (a channel layer in which the movement of charge is controlled due to the gate electrode) of the thin film transistor TFT, the electrode arranged at the video signal line 12 side is set as the drain electrode and the electrode at the pixel electrode (capacitance $C_{LC}$) side as the source electrode. However, the naming of these electrodes can be exchanged based on the relative relationship between potentials of both electrodes. In this specification, for the sake of convenience, the electrode of the thin film transistor TFT at the video signal line 12 side is referred to as the drain electrode and the electrode of the thin film transistor TFT at the pixel electrode side is referred to as the source electrode.

On the other hand, to the counter electrode which constitutes the capacitance $C_{LC}$ together with the pixel electrode, the reference voltage Vcom is supplied through a reference voltage line 11. Depending on the mode of applying voltage to the liquid crystal layer (modulation of optical transmissivity of the liquid crystal layer), the counter electrodes and the reference voltage lines 11 are formed on either a substrate (also referred to as a TFT substrate) on which the above-mentioned scanning signal lines 10, the video signal lines 12, the thin film transistors TFT and the pixel electrodes are formed or another substrate which faces the TFT substrate in an opposed manner while sandwiching a liquid crystal layer therebetween. Since the former liquid crystal display device generates an electric field in a liquid crystal layer along a main surface of the TFT substrate, the liquid crystal display device is referred to as an in-planes-switching (abbreviated as IPS) type liquid crystal display device or a lateral electric field type liquid crystal display device. On the other hand, since the latter liquid crystal display device generates an electric field in a liquid crystal layer along the thickness direction, the device is also referred to as a vertical electric field type liquid crystal display device. Here, in the vertical electric field type liquid crystal display device, there may be a case in which one counter electrode corresponds to a plurality of pixel electrodes (for example, all pixel electrodes arranged within the above-mentioned display screen SCR) and the above-mentioned capacitance $C_{LC}$ is formed for every pixel or the counter electrode also performs a function of the reference voltage line 11 on a main surface of another substrate which faces the TFT substrate in an opposed manner. Such a vertical electric field type structure is applicable to a liquid crystal display device using twisted nematic liquid crystal which gradually twists a long axis direction of liquid crystal molecules in the inside of the liquid crystal layer from the TFT substrate to the substrate which faces the TFT substrate in an opposed manner (a so-called TN type liquid crystal display device) and a so-called vertically aligned type (VA type) liquid crystal display device which aligns a long axis of liquid crystal modules with respect to the main surface of the TFT substrate with an inclination of a given angle.

The above-mentioned scanning signal lines 10 are respectively electrically connected to output terminals of a driving circuit (a vertical scanning circuit or also referred to as a gate driver) V-DRV and receive the scanning signals Y1, Y2, Y3, ... Yend. The above-mentioned video signal lines 12 are respectively connected to output terminals of a driving circuit (a video signal driving circuit or also referred to as a drain driver) H-DRV different from the driving circuit V-DRV and receive the video signals X1R, X1G, X1B, ... XendB. Data on images to be displayed on the liquid crystal display device is inputted to a control circuit (also referred to as a timing converter) TCON from the outside and the scanning signals and the video signals (possibly including gray scale signals) which are suitable for operation of the liquid crystal display device are generated.

Further, the pixel PIX shown in FIG. 15 is also provided with another capacitance Cad besides the above-mentioned capacitance $C_{LC}$. The capacitance Cadd is also referred to as an additional capacitance or a storage capacitance and is provided for holding a charge supplied to the pixel electrode of each pixel in response to the video signal until a point of time that a charge corresponding to a next video signal is supplied to the pixel electrode.

SUMMARY OF THE INVENTION

However, as described above, in the active matrix type liquid crystal display device, it is also necessary to form the active elements (switching elements) such as the field effect type transistors or diodes on the substrate on which the pixel electrodes are formed. Accordingly, an undulation is formed on the main surface of the substrate due to the mounting of the active elements.

On the other hand, to modulate the light transmissivity of the liquid crystal layer in response to images, it is important to satisfy a so-called initial orientation condition that the liquid crystal molecules in the liquid crystal layer are oriented in a given mode with respect to an uppermost surface (a surface which faces the liquid crystal layer) of the substrate on which the pixel electrodes are formed. To satisfy this initial orientation condition, for example, it is necessary to apply a mechanical or optical treatment to a main surface of the orientation film formed on the uppermost surface of the substrate and to adjust the direction and the inclination of the long axis direction of the liquid crystal molecules with respect to the main surface of the substrate on which the orientation film is formed. Accordingly, it is ideal that the main surface of the orientation film is leveled to an extent which is comparable with the leveling of the main surface of the substrate. To cope with such a demand, in an actual manufacturing, an insulation film is formed on the substrate on which the active elements are formed such that the insulation film covers the active elements so as to level the undulation on the uppermost surface of the substrate (the main surface of the film which is formed on the main surface of the substrate and comes into contact with the liquid crystal layer) to an extent that the above-mentioned initial orientation condition is satisfied (such that at least stepped portions produced by active elements can be reduced). Such an insulation film is also referred to as a protective film, a leveling layer or a passivation layer.

However, inventors of the present invention have found problem on a so-called "image retention" that when an operational power supply of the liquid crystal display device is cut off, an image which has been displayed until now on a display screen slightly remains. The inventors also have considered that this image retention is partially attributed to the above-mentioned insulation film which covers the active elements.

The procedure through which the inventors have arrived at such an idea is as follows.

A voltage which is applied to the liquid crystal layer during the image display operation (also referred to as liquid crystal driving) of the liquid crystal display device is also applied to the insulation film formed on the substrate on which the active elements are formed (hereinafter referred to as "TFT substrate") and a charge is stored on an upper surface and a lower surface of the insulation film due to a dielectric constant of the insulation film. On the TFT substrate on which the field effect type transistors are formed as the active elements, a so-called gate insulation film which performs an insulation between the above-mentioned gate electrodes and a channel layer and the above-mentioned protective film which covers the transistors are formed. Since the gate insulation film is provided with the gate electrodes and the scanning signal lines which come into contact with one surface thereof and the source electrodes, drain electrodes and video signal lines which come into contact with other surface thereof, it is easy for the gate insulation film to sweep out the stored charge. However, the protective film brings only one surface thereof into contact with the source electrodes, the drain electrodes, the video signal lines or the gate electrodes and the scanning signal lines and brings the other surface thereof into contact with only materials such as the orientation film and the liquid crystal display layer which hardly allow the flow of electricity therethrough. Accordingly, the charge stored in the above-mentioned protective film is not discharged even when the liquid crystal display device is turned off and remains in the protective film for a considerable time and hence, an offset voltage is applied to the liquid crystal layer due to this residual charge whereby the above-mentioned image retention occurs on the display screen. The phenomenon in which even after the power supply to the liquid crystal display device is cut off, the image written before cutting off the power supply is retained on the display screen for a fixed time is also referred to as "sticking" of image.

The inventors of the present invention also have found that the image retention is liable to occur easily under following situations.

(1) the dielectric film such as the gate insulation film, the protective film or the like which is formed on the TFT substrate is liable to relatively easily store the charge (for example, such a film having a small film thickness and made of material having a high dielectric constant).

(2) The driving voltage of the liquid crystal (voltage applied to the liquid crystal layer) is relatively high.

(3) The resistivity of the liquid crystal material per se is relatively large.

Based on such a finding, the inventors have considered that, to solve the above-mentioned image retention, it is necessary to set the shape and physical properties of the dielectric film such as the gate insulation film, the protective film or the like formed on the TFT substrate such that the charge hardly remains on the dielectric film. For example, it is preferable to form the dielectric film such that the film thickness of the dielectric film is increased or the relative dielectric constant of the dielectric film is reduced.

One solution to satisfy these requests is disclosed in Japanese Patent 2938521, for example. This publication discloses an invention which can suppress the luminance irregularities generated in a liquid crystal display device wherein a silicon nitride (SiN) film and an amorphous silicon (a-Si) film are sequentially laminated to a thin film transistor to form a protective film and, thereafter, a given potential is applied to the amorphous silicon film which also constitutes a conductive material under the irradiation of light so as to make the charge storing state in a plane of the protective film uniform. This publication teaches that by holding the whole area of the surface of the protective film at a fixed potential, the above-mentioned luminance irregularities can be suppressed even after the image display operation is performed for a long time.

However, the inventors of the present invention have faced following problems in applying the invention disclosed in the above-mentioned patent publication to the above-mentioned suppression of image retention.

First of all, in the in-plane-switching type (lateral electric field type) liquid crystal display device, in view of achieving the initial orientation of the liquid crystal molecules in the liquid crystal layer, it is desirable to cover both of the pixel electrodes and the counter electrodes which generate the electric field for driving the liquid crystal with the protective film. However, the electric field which is generated between the pixel electrode and the counter electrode inevitably enters the liquid crystal layer through the protective film and hence, when the protective film includes a thin film made of the conductive material as described above, the electric field is consumed in the generation of current in the inside of the film. Accordingly, the electric field generated between the pixel electrode and the counter electrode substantially cannot enter the liquid crystal layer and hence, it is not exaggerating to state that the orientation of the liquid crystal molecules present in the liquid crystal layer cannot be controlled (the light transmissivity of liquid crystal layer cannot be modulated).

To confirm the advantageous effect of the invention disclosed in the above-mentioned publication, an amorphous silicon film which exhibits the conductive property and has a film thickness of 20 nm is formed on a protective film of a conventional in-plane-switching type liquid crystal display device. As a result, it is found that such a liquid crystal display device cannot drive the liquid crystal and it is impossible to perform even the evaluation of the quality of images.

On the other hand, also with respect to the active matrix type liquid crystal display device in general, the application of the invention described in the publication to such a liquid crystal display device gives rise to following drawbacks. For example, in a thin film transistor which is referred to as a bottom gate type in which a gate electrode is formed on a main surface side of a substrate and a semiconductor film which constitutes a channel layer is arranged on the gate electrode, the above-mentioned amorphous silicon film faces the semiconductor film (the channel layer of the thin film transistor) through an insulation film which forms the protective film together with the amorphous silicon film. Accordingly, the electric field is applied to the semiconductor film from both of the gate electrode and the amorphous silicon film which are held at a fixed potential so that even when the voltage of the gate electrode is set lower than a threshold value voltage of the thin film transistor, the semiconductor film holds a state in which the electric field is applied thereto for some time. As a result, there arise new drawbacks exemplified by the increase of cut-off current of the thin film transistor and the occurrence of image retention attributed to such an increase of cut-off current. Further, also with respect to the active matrix type liquid crystal display device which uses the top-gate type thin film transistors or the thin film diodes as the switching elements in which the semiconductor films (channel layers) are formed on the substrate main surface side and the gate electrodes are arranged on the semiconductor films, it has been pointed out that erroneous operations of the switching elements are induced due to the parasitic capacitance generated between the thin film transistor or the thin film diode and the above-mentioned amorphous silicon film which is held at a fixed potential.

To summarize the above-mentioned reviews, although efforts have been made to solve the phenomenon that the charge stored in the protective film which is the cause of the occurrence of image retention remains in the protective film for a long time by holding the in-plane of the protective film at a fixed potential, the result of the effort is that although no luminance irregularities are generated, the image retention remains as it is. Accordingly, even with the use of the method taught in the above-mentioned patent publication in which the conductive film is applied to the insulating protective film, it is extremely difficult to obtain both of the suppression of image retention and the luminance irregularities and the applying of cut-off current to the thin film transistors and the applying of driving electric field to the liquid crystal layer.

There may be an idea to solve such an image retention problem only by improving the gate insulation film. However, since the insulation film affects the electric characteristics of the thin film transistors which constitute the switching elements of the liquid crystal display device, the increase of the film thickness or the reduction of the electric capacitance which is obtained by lowering the relative dielectric constant brings about drawbacks to the contrary. Further, although the protective film receives less restrictions with respect to the shape and physical properties compared to the gate insulation film, the protective film affects the turn-off current of the thin film transistor or there exist restrictions on the treatment capacity of a plasma CVD device which forms the protective film. Accordingly, it is not realistic to adjust the film thickness and the relative dielectric constant of the protective film only for the purpose of alleviation of image retention in the same manner as the gate insulation film.

Accordingly, it is one of objects of the present invention to solve the trade-off relationship between the above-mentioned suppression of image retention and the luminance irregularities as well as the trade-off relationship between the electric properties of the switching element and the efficiency of applying electric field to the liquid crystal layer in the active matrix type liquid crystal display device.

In view of the above-mentioned object, the present invention provides liquid crystal display devices as exemplified as follows.

According to one aspect of the present invention, in a liquid crystal display device which is provided with a pair of substrates which are arranged to face each other in an opposed manner and a liquid crystal layer which is sandwiched between main surfaces of a pair of substrates, on the main surface of one of the pair of substrates which faces the liquid crystal layer, pixel regions including switching elements and pixel electrodes which are connected to the switching elements and a protective film which is formed by laminating a plurality of material layers at the liquid crystal layer side of the switching elements are formed. The plurality of material layers include at least a first layer (material layer) and a second layer (material layer) which is arranged closer to the liquid crystal layer side than the first layer (above the first layer as viewed from one main surface of the pair of substrates). Further, the second layer exhibits resistivity which is lower than resistivity of the first layer and higher than resistivity of silicon. Here, silicon is exemplified a so-called semiconductor material which forms channels of the switching elements provided to the liquid crystal display device such as single crystal silicon, poly-crystalline silicon, amorphous silicon. Accordingly, the second layer included in the above-mentioned protective film may be characterized in that the second layer exhibits resistivity which is lower than resistivity of the first layer included in the protective film and is higher than resistivity of the channel layers of switching elements.

These first layer and second layer are also characterized in that with the irradiation of light, the first layer exhibits the resistivity of not less than $1.0\times10^{13}$ $\Omega$cm and the second layer exhibits the resistivity of not more than $1.0\times10^{11}$ $\Omega$cm. Such photo conductive property of the protective film can be measured by irradiating light having illuminance of equal to or more than 500 kLx (kilo-lux) to the first layer and the second layer or by irradiating the light to the protective film structure from a side opposite to the main surface of the substrate on which these layers are formed.

As described above, to describe the protective film structure according to the present invention which sequentially laminates the first layer and the second layer in this order on the main surface of the substrate on which the switching elements are formed in view of the relative dielectric constant, the second layer has the higher relative dielectric constant than the first layer and the second material layer assumes the relative dielectric constant of not less than 7.5.

Further, the liquid crystal display device is characterized in that when the protective film which is formed at the liquid crystal layer side of the above-mentioned switching element is formed of material: $Si_xN_yX_z$ (X being a general term of other constitutional element) which contains at least silicon and nitride, the composition ratio of nitrogen relative to silicon (y/x) of the second layer is smaller than that of the first material layer.

It is preferable that the first layer and the second layer which constitute the above-mentioned protective film further satisfy at least one of following modes.

In one mode, the resistivity of the second layer is set to a value less than 1/100 of the resistivity of the first layer.

In another mode, the resistivity of the second layer is set lower than the resistivity of the first layer.

In still another mode, a thickness of the second layer is set to a value not more than ½ of a total thickness of the protective film and the thickness of the second layer is preferably set to a value not less than 10 nm.

Although the novel characteristics of the protective film which covers the switching elements formed on the substrate in the liquid crystal display device of the present invention have been described by focusing on the cross-sectional structure, to grasp the features of the protective film as a plan view of the substrate at the liquid crystal layer side, they are as follows.

One feature is that in a liquid crystal display device in which the device is provided with a pair of substrates which are arranged to face each other in an opposed manner and a liquid crystal layer which is sandwiched between main surfaces of a pair of substrates, and on the main surface of one of the pair of substrates which faces the liquid crystal layer, pixel regions including switching elements and pixel electrodes which are connected to the switching elements and a protective film which comes into contact with liquid crystal layer sides of the switching elements are formed, when light is irradiated to a surface of the protective film which faces the liquid crystal layer, the resistivity of the protective film is reduced to a value not more than 1/100 of the resistivity of the protective film when light is not irradiated to the surface of the protective film. Here, the light irradiation means to irradiate light having illuminance of not less than 500 kLx, for example, to the upper surface of the protective film.

Another feature is that in a liquid crystal display device in which the device is provided with a pair of substrates which are arranged to face each other in an opposed manner and a liquid crystal layer which is sandwiched between main surfaces of a pair of substrates, and on the main surface of one of the pair of substrates which faces the liquid crystal layer, pixel regions including switching elements and pixel electrodes which are connected to the switching elements and a protective film which comes into contact with liquid crystal layer sides of the switching elements are formed, a surface of the protective film which faces the liquid crystal layer in an opposed manner exhibits the dark resistivity which falls in a range of $1.0\times10^{13}$ $\Omega$cm to $1.0\times10^{15}$ $\Omega$cm and exhibits the resistivity of $1.0\times10^{9}$ $\Omega$cm to $1.0\times10^{11}$ $\Omega$cm when light having illuminance of 500 kilo lux is irradiated to the surface of the protective film.

Still another feature is that in a liquid crystal display device in which the device is provided with a pair of substrates which are arranged to face each other in an opposed manner and a liquid crystal layer which is sandwiched between main surfaces of a pair of substrates, and on the main surface of one of the pair of substrates which faces the liquid crystal layer, pixel regions including switching elements and pixel electrodes which are connected to the switching elements and a protective film which comes into contact with liquid crystal layer sides of the switching elements are formed, a surface of the protective film which faces the liquid crystal layer in an opposed manner exhibits the relative dielectric constant of not less than 7.5.

Further, when the protective film is formed of material containing at least silicon and nitrogen: $Si_xN_yX_z$ (X being a general term of other constitutional element), the liquid crystal display device is characterized in that the device is provided with a pair of substrates which are arranged to face each other in an opposed manner and a liquid crystal layer which is sandwiched between main surfaces of a pair of substrates, and on the main surface of one of the pair of substrates which faces the liquid crystal layer, pixel regions including switching elements and pixel electrodes which are connected to the switching elements and a protective film which comes into contact with the channel layers of the switching elements are formed, the composition ratio of nitrogen relative to silicon (y/x ratio) of the surface of the protective film which faces the liquid crystal layer assumes a value which is larger than 0 and falls in a range below 1.0.

In a liquid crystal display device having at least one of the above-mentioned features, it is preferable to form an orientation film on the liquid crystal layer side of the protective film. Further, when the liquid crystal display device is constituted such that, as in the case of the twisted nematic (TN) type liquid crystal display device, the counter electrodes which apply an electric field to the liquid crystal layer along with the pixel electrodes are formed on the other of the pair of substrates, it is preferable to form the pixel electrodes between the protective film and the liquid crystal layer (more preferably between the protective film and the orientation film).

On the other hand, when the liquid crystal display device having at least one of the above-mentioned features is constituted such that, as in the case of the in-plane-switching type liquid crystal display device, the pixel electrodes and the counter electrodes are formed on one of the pair of substrates, it is preferable to form the pixel electrodes at a side opposite to the liquid crystal layer with respect to the protective layer (a main surface side of one of a pair of substrates).

According to the above-mentioned liquid crystal display device of the present invention, in a manufacturing method which includes a first step in which a plurality of switching elements are formed on a main surface of one of a pair of substrates and a second step in which a protective film is formed on upper portions of the switching elements by a chemical vapor deposition method using a plasma gas in which a plurality of gases are introduced, at least one of following features is reflected in the second step so that the resistivity of the second layer which constitutes the protective film can be set lower than the resistivity of the first layer which constitutes the protective film.

One feature is that the first material layer having at least the first composition is formed by vapor deposition and, thereafter, the second material layer having at least the second composition which is different from the first composition is formed by vapor deposition by changing the introduction ratio of a plurality of raw material gases.

Further, another feature is that at least the above-mentioned first material layer is formed by vapor deposition and, thereafter, the second material layer is formed by vapor deposition by setting electric power supplied to the plasma lower than electric power at the time of forming the first material layer by vapor deposition.

In the second step, when the first gas which contains silicon (for example, monosilane) and the second gas which contains nitrogen (for example, ammonia) are used as the above-mentioned plurality of raw material gases, it is preferable to set an introduction amount ratio of the second gas relative to the first gas to a value larger than 1.0 at the time of forming the first material layer by vapor deposition and to a value which falls in a range larger than 0 and not more than 1.0 at the time of forming the second material layer by vapor deposition.

Further, in the second step, the high frequency electric power introduced to plasma at the time of forming the second material layer by vapor deposition is suppressed to a value lower than high frequency electric power at the time of forming the first material layer by vapor deposition. For example, it is preferable to set the high frequency electric power to not more than $0.2$ $W/cm^2$.

The manner of operation and advantageous effects which have been described heretofore and the detail of preferred embodiments will become apparent from the explanation made hereinafter.

BRIEF DESCRIPTION OF THE DRAWINGS

FIG. 13 shows one of video signal line terminals suitable for the liquid crystal display device according to the second embodiment of the present invention, wherein

DETAILED DESCRIPTION

Figure 1:
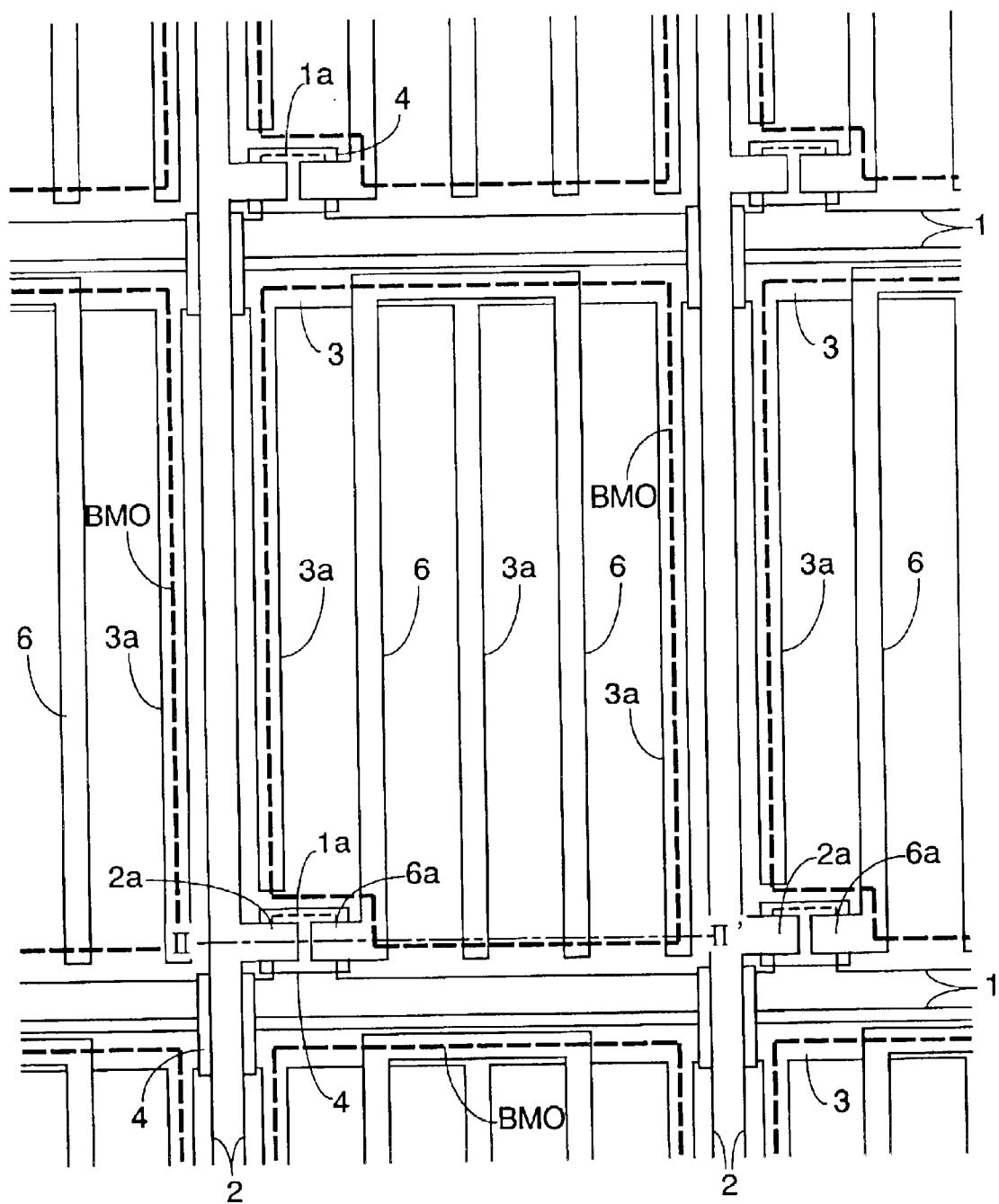
FIG. 1 is a plan view showing one of a plurality of pixels formed on a main surface of one of a pair of substrates which constitute an in-plane-switching type liquid crystal display device according to the first embodiment of the present invention in an enlarged form.

Hereinafter, the specific embodiment of the present invention is explained in conjunction with drawings relating to the embodiment. In the drawings which are referred to the explanation described hereinafter, parts having identical functions are given same symbols and the repeated explanation is omitted.

<<First Embodiment>>

The liquid crystal display device of the first embodiment according to the present invention is explained by illustrating the structure of a TFT substrate used in the above-mentioned in-plane-switching type liquid crystal display device and manufacturing steps thereof.

Figure 2:
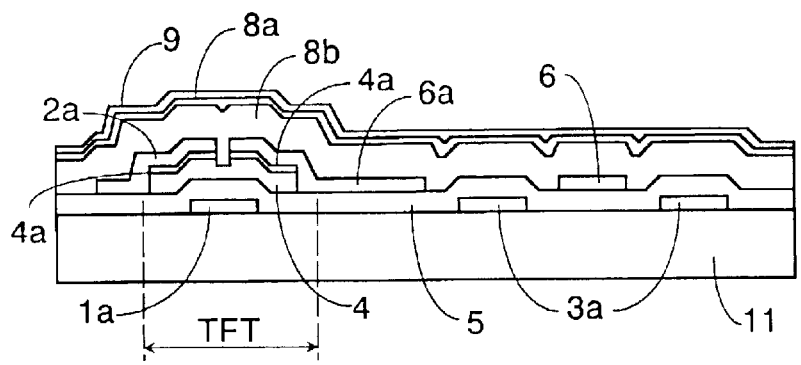
FIG. 2 is a cross-sectional view obtained by cutting a TFT substrate along a chain line II–II' in FIG. 1.

FIG. 1 is a plan view showing one of a plurality of pixels formed on a main surface (which faces a liquid crystal layer) of TFT substrate which is used in the in-plane-switching type liquid crystal display device in an enlarged form and FIG. 2 is a cross-sectional view obtained by cutting the TFT substrate along a chain line C–C' in FIG. 1.

FIG. 1 shows pixels which include thin film transistors TFT each of which has a gate electrode 1a which is branched from a scanning signal line 1 shown at a lower side of the drawing, a semiconductor layer (channel layer) 4 which covers the gate electrode 1a, a drain electrode 2a which is branched from a video signal line 2 shown at a left column of the drawing, and a source electrode 6a which is integrally formed with a pixel electrode 6, the above-mentioned pixel electrodes 6 which extend in the y direction and are arranged in parallel in the x direction, and counter electrodes 3a each of which is branched in the y direction from a reference voltage line 3 shown at the upper side of the drawing and arranged in parallel in a spaced-apart manner from the pixel electrode along the x direction. In such a pixel, a region through which light transmits is defined by an opening formed in a light shielding film (hereinafter referred to as a black matrix) which is formed on the other substrate (also referred to as a counter substrate or a color filter substrate) which faces the TFT substrate in an opposed manner while sandwiching the liquid crystal layer. In FIG. 1, the opening formed in the black matrix is a region which is surrounded by a broken line BMO which indicates a brim of the opening. In the cross section of the TFT substrate shown in FIG. 2, the liquid crystal layer and the other substrate which faces the TFT substrate in an opposed manner are omitted. On a main surface of the TFT substrate, a plurality of pixels having the same structure as the above-mentioned pixel shown at the center of FIG. 1 are arranged two dimensionally. One example of the mode or arrangement of a plurality of pixels is shown in FIG. 1 such that eight other pixels surround one center pixel (the eight pixels being shown partially).

First of all, the manufacturing steps of the TFT substrate according to this embodiment are explained in conjunction with FIG. 1 and FIG. 2. Many of these manufacturing steps adopt techniques which are adopted by a manufacturing method for manufacturing an existing liquid crystal display substrate or a liquid crystal display panel and hence, they are explained briefly. Further, the characteristics manufacturing steps for manufacturing the liquid crystal display device according to the present invention are explained by suitably adding drawing and in conjunction with these drawings.

Step 1: As the TFT substrate 11, a glass substrate having a size of 370 mm×470 mm×1.1 mm is prepared. Although the pixels shown in FIG. 1 are formed on a main surface of the glass substrate two dimensionally, the main surface merely constitutes a simple glass surface at a stage of step 1. With the use of such a glass substrate as the TFT substrate 11, a liquid crystal display panel (also referred to as a liquid crystal cell) having a display screen of 38 cm in an orthogonal direction can be manufactured.

Step 2: After cleaning the main surface (the upper surface in FIG. 2) of the glass substrate 11, a first conductive film made of metal, an alloy or the like is formed on the main surface by a sputtering method, for example. In this embodiment, a chromium (Cr) thin film having a thickness of 200 nm is formed by a sputtering method. A photo resist (a photosensitive organic material) is applied onto the chromium thin film and light is irradiated to the photo resist through a photo mask (a light shielding plate having a plurality of slits) so as to partially photosensitize the photo resist.

Thereafter, the photosensitized portions are selectively removed by performing a developing processing so that the chromium thin film is exposed partially through the openings formed in the photo resist. All of the above-mentioned processing in step 2 are collectively referred to as a photolithography method. A plurality of slits formed in the photo mask have shapes which correspond to respective profiles of the above-mentioned scanning signal lines 1 (also referred to as gate bus lines), gate electrodes 1a, reference voltage lines 3 (also referred to as counter voltage signal lines, common bus lines in the in-line-switching type liquid crystal display device) and counter electrodes 3a. Further, when a photo resist which is formed at an outside (a peripheral portion) of a portion corresponding to a display region of the TFT substrate is exposed using the above-mentioned photo mask, it is also possible to provide slits which correspond to terminals (not shown in the drawing) provided to the peripheral portion of the photo mask for connecting the TFT substrate and an external circuit and a protective circuit (not shown in the drawing) for protecting the thin film transistor in the inside of the display region from the insulation breakdown derived from the static electricity or the like. Here, depending on the photo resist and chemicals which develops the photo resist, portions of the photo resist which are not photosensitized are removed by developing processing, such a difference does not obstruct the manufacturing of the TFT substrate according to the present invention.

Step 3: At a stage that step 2 is completed, on an upper surface of the first conductive film made of chromium, the photo resist having shapes similar to the above-mentioned scanning signal lines, the gate electrodes and the like remain. By treating the upper surface of the first conductive film using chemicals such as a nitric acid second cerium ammonium aqueous solution (an etchant which etches chromium), for example, the first conductive film (chromium thin film) which is not covered with the resist is removed from the main surface of the TFT substrate 11. This treatment is referred to as an etching method. After forming the scanning signal lines 2, the gate electrodes 2a, the reference voltage lines 3, the counter electrodes 3a and the like made of the first conductive film on the TFT substrate 11, the photo resists remaining on the upper surfaces thereof are removed using nitric acid or the like, for example, and thereafter, these parts are cleaned with deionized water (water filtered by ion exchange resin).

Figure 3:
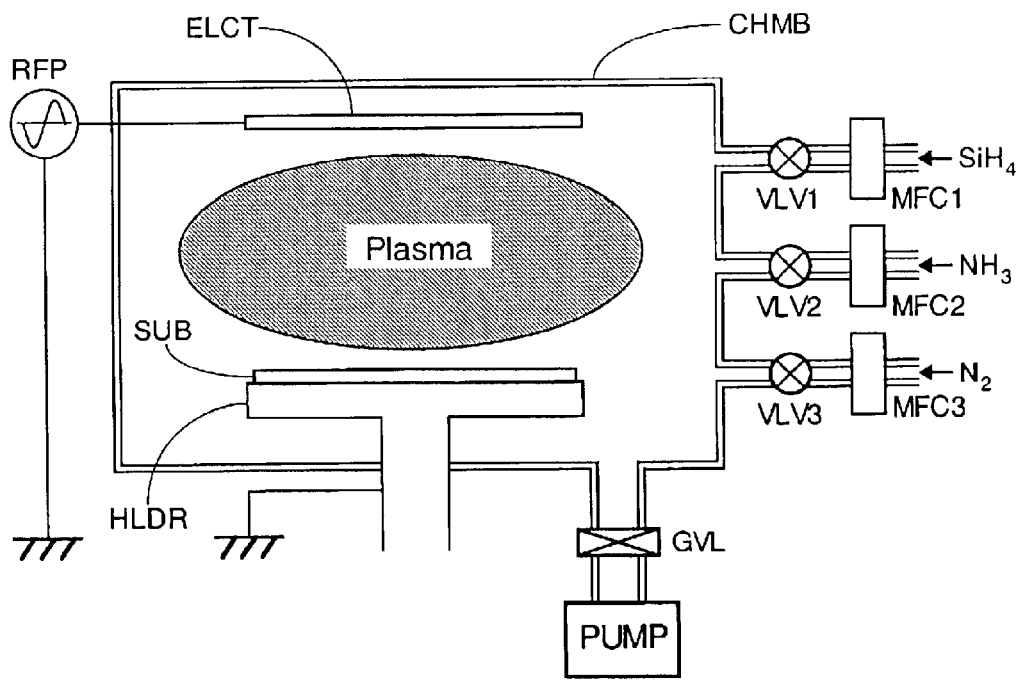
FIG. 3 is a cross-sectional view schematically showing a vapor deposition apparatus served for formation of a silicon nitride film using a plasma CVD.

Step 4: On an upper surface of the TFT substrate 11 on which the pattern of the lines (scanning signal lines and the like) and the electrodes (gate electrodes and the like) formed of the first conductive film are formed, the insulation film 5 and the semiconductor film 4 are laminated in this order. The insulation film 5 also constitutes a gate insulation film in the thin film transistor which will be explained later. In this embodiment, the insulation film 5 is formed of an amorphous silicon nitride film ($SiN_x$) and the semiconductor film 4 is formed of an amorphous silicon film (a-Si). Since the insulation film 5 and the semiconductor film 4 are both made of materials which contain silicon, in this embodiment these films are continuously grown on the main surface of the TFT substrate using a chemical vapor deposition method (also referred to as a CVD method). This embodiment adopts a plasma enhanced CVD method in which plasma is generated using raw material gases for the insulation film 5 and the semiconductor film 4 and an upper surface (working surface) of the TFT substrate 11 is made to face this plasma in an opposed manner. An apparatus which is served for the plasma enhanced CVD method is schematically shown in FIG. 3. Although the detail of the apparatus will be described later, the TFT substrate is placed on a holder HLDR as a specimen SPCM.

Immediately before the completion of the continuous growth of the amorphous silicon nitride film and the silicon film obtained by the plasma enhanced CVD method, an impurity element which gives the conductive property to the semiconductor film 4 is added to the raw material gases and, thereafter, the vapor deposition is performed so that a region 4a of $n^+$ type having high electron density is formed in the vicinity of an upper surface of the semiconductor film 4. In this embodiment, as the impurity element, phosphorous (P) which is one of elements of Group V which having large valence electrons compared to silicon (Si) of Group IV is used as a dopant. This $n^+$ type semiconductor layer 4a connects the second metal film which is formed subsequently with the semiconductor layer 4 at a low electric resistance (bringing the second metal film and the semiconductor layer 4 into an ohmic contact). In this embodiment, the thickness of portions of the insulation film 5 and the semiconductor film 4 to which the impurity is not intentionally introduced (indicated as the semiconductor film 4 in FIG. 2) and the thickness of portions of the semiconductor film to which the impurity is intentionally introduced indicated by the $n^+$ type semiconductor layer 4a in FIG. 2) are respectively set to 400 nm, 250 nm and 50 nm. In place of forming the $n^+$ type semiconductor layer 4a at the time of forming the semiconductor film by vapor deposition using the CVD or the like, for example, it is possible to adopt the ion implantation in which ions of a dopant are implanted into the semiconductor film after growth or a method which moves atoms of metal or alloy into the semiconductor film by heat treatment or the like after the second conductive film made of metal or alloy is bonded to the semiconductor film. Further, with respect to an image obtained by a transmission electron microscope, it is difficult to discriminate the region in the semiconductor film to which the impurity is not doped intentionally (also referred to as an intrinsic semiconductor region, hereinafter referred to as an i-type region for the sake of convenience) and a region of the semiconductor film to which the impurity is intentionally doped (the above-mentioned $n^+$ type region) and hence, the semiconductor film 4 and the $n^+$ type semiconductor layer 4a in FIG. 2 are observed as one semiconductor layer.

Step 5: After completing the formation of the insulation film 5 and the semiconductor film 4, a photo resist is patterned on the semiconductor film 4 using the previously mentioned photolithography method. The pattern is constituted of "islands" of photo resist which are respectively left on upper portions of the gate electrodes 1a and upper portions of the portions where the scanning signal line 1 and the reference voltage line 3 cross the video signal line 2.

Step 6: Subsequently, the semiconductor film 4 having an upper surface on which the above-mentioned islands of photo resist are not formed is removed by a dry etching method which uses sulfur hexafluoride ($SF_6$) and hydrogen chloride (HCl) thus leaving the semiconductor film 4 (including the above-mentioned $n^+$ type region) which constitutes the channel layer of the thin film transistor on the gate electrode 1a and the semiconductor film 4 which prevents the disconnection of the video signal line 2 on respective portions where the scanning signal line 1 and the reference voltage line 3 cross the video signal line 2 which will be explained later. Thereafter, the above-mentioned islands formed of resist are removed in accordance with step 3. Here, the insulation film 5 remains on at least the whole area of the display region on the main surface of the TFT substrate 11 at this stage.

Step 7: Subsequently, the second conductive film made of metal or alloy is formed such that the second conductive film covers the above-mentioned semiconductor film 4 (including $n^+$ type region 4a) and the above-mentioned insulation film 5 by a sputtering method. In this embodiment, the second conductive film is formed of a thin film made of chromium having a thickness of 200 nm. The photolithography method described in step 2 and the etching method described in step 3 are applied to the second conductive film made of chromium thus forming the video signal lines (also referred to as drain bus lines) 2, the drain electrode 2a, the pixel electrodes 6 and the source electrodes 6a. In a series of these steps, as described in conjunction with step 2, terminals (not shown in the drawing) which are connected to an external circuit, and a pattern (not shown in the drawing) of the above-mentioned protective circuit and the like are formed on a periphery of a photo mask and these components are formed together with the video signal lines 2 and the like by the etching method. In this step, after completion of etching using an etchant for chromium, the processing enters a next step 8 without removing the photo resist.

Step 8: While leaving the photo resist on the drain electrode 2a and the source electrode 6a as it is, dry etching is applied to the above-mentioned conductive film 4 (including $n^+$ type region. 4a) using a mixed gas of sulfur hexafluoride gases and a hydrogen chloride gas in the same manner as step 6. With respect to this etching gas used in the etching step, the amorphous silicon film is more liable to be etched compared to the chromium thin film so that the semiconductor film 4 is etched using the drain electrode 2a and the source electrode 6a as masks. Due to this dry etching, the semiconductor film 4 including the above-mentioned $n^+$ type region 4a is etched with a thickness which corresponds to 100 nm as a process designing value from the above surface. As described in conjunction with step 4, a thickness of $n^+$ type region 4a is 50 nm. Accordingly, in the semiconductor film 4 on which the second conductive film such as the drain electrodes 2a and the source electrodes 6a and the like are not formed, the $n^+$ type region 4a formed along the upper surface is completely removed. Accordingly, the $n^+$ type region 4a which extends from the drain electrode 2a to the source electrode 6a at the time of completion of step 7 is separated between two electrodes and the i-type region of the semiconductor film 4 becomes thinner during this period. So long as the thin film transistor is concerned, the structure is substantially completed by this step. After applying the dry etching to the semiconductor film 4, the photo resist is removed using chemicals in the same manner as step 3.

Step 9: In this step, over the above-mentioned thin film transistors, the pixel electrodes 6 and the counter electrodes 3a, the protective film 8 which is suitable for reducing the previously mentioned image retention are formed. In this embodiment, in the same manner as step 4, two kinds of thin films made of amorphous silicon nitride ($SiN_X$) which differ in composition from each other are sequentially laminated to an uppermost surface (at a stage prior to starting this step) of the TFT substrate by a plasma enhanced CVD method thus forming the protective film 8 which is constituted of two-layered silicon nitride films (8a, 8b from above in FIG. 2). The two-layered silicon nitride films 8a, 8b are formed on the whole region of a portion of the TFT substrate which corresponds at least the display region. The formation of the silicon nitride films by the plasma enhanced CVD method is performed using the vapor deposition apparatus which is schematically shown in FIG. 3.

In this vapor deposition apparatus, a holder HLDR on which a work piece (a specimen SPCM) is placed and an electrode ELCT which faces the holder HLDR in an opposed manner are disposed in the inside of a housing CHMB, the electrode ELCT which is connected to a high frequency power supply RFP is capacitively connected to the holder HLDR which is connected to a ground potential, and plasma is generated between the holder HLDR and the electrode ELCT. With respect to this plasma, the ionization state of the gases supplied to the housing CHMB is maintained by adjusting the pressure in the inside of the housing CHMB using an exhaust device PUMP connected to the housing CHMB through a valve GVL and by adjusting electric force supplied to the electrode ELCT from the high frequency power supply RFP. As gases which generate the plasma, monosilane ($SiH_4$), ammonia ($NH_3$) and nitrogen ($N_2$) are indicated in FIG. 3. Supply amounts of these gases into the housing CHMB are suitably adjusted by operating valves VLV1, VLV2, VLV3 while monitoring respective flow rates using flow rate meters MFC1, MFC2, MFC3 which are provided to respective flow passages.

The above-mentioned two layered silicon nitride films 8a, 8b are grown by changing the vapor deposition apparatus corresponding to the composition of the film. Further, the above-mentioned two layered silicon nitride films 8a, 8b may be grown in separate reaction chambers corresponding to the composition of the film using a vapor deposition apparatus provided with a plurality of reaction chambers (housing CHMB shown in FIG. 3) and a system which transports a work piece between these chambers and the system under reduced pressure atmosphere. However, in the embodiment described hereinafter, the two layered silicon nitride films 8a, 8b are continuously formed without stopping a discharge in the inside of the reaction chamber without changing the vapor deposition apparatus and the reaction chambers.

Respective film forming conditions of the upper-side silicon nitride film 8a and the lower-side silicon nitride film 8b are described in Table 1.

TABLE 1

| Parameter (Unit) | lower-side silicon nitride film 8b | upper-side silicon nitride film 8a |
| --- | --- | --- |
| $SiH_4$ - flow rate ($cm^3$/min.) | 130 | 350 |
| $NH_3$ - flow rate ($cm^3$/min.) | 1200 | 100 |
| $N_2$ - flow rate ($cm^3$/min.) | 2500 | 2000 |
| Reaction pressure (Pa) | 266 | 266 |
| RF (radio frequency) power (W) | 2500 | 350 |
| Substrate temperature (° C.) | 250 | 250 |
| Film thickness (nm) | 500 | 0, 10, 20, 30 |

As shown in Table 1, the inventors have prepared four kinds of TFT substrates which differ in the thickness of the upper-side silicon nitride film 8a and have performed the comparison of these TFT substrates as described later. Here, one of four kinds of TFT substrates is the substrate on which the upper-side silicon nitride film 8a is not formed and which the inventors conventionally produced.

The feature of this step lies in that in the process for forming the protective film 8, the flow rate ratio of the raw material gases, that is, the flow rate ratio between the flow rate of monosilane gas ($SiH_4$ flow rate) and the flow rate of ammonia gas ($NH_3$ flow rate) at the time of growth of the lower-side silicon nitride film 8b is inverted at a point of time for starting the growth of the upper-side silicone nitride film 8a.

The inventors conventionally grew the amorphous silicon oxide film by setting a supply amount of the ammonia gas (or a nitride gas which is capable of substituting the ammonia gas) into the plasma larger than a supply amount of the monosilane gas (or a silicon compound gas which is capable of substituting the monosilane gas) and used such an amorphous silicon nitride film as the protective film. To the contrary, when the inventors have reviewed the growth conditions of the amorphous silicon nitride film in reducing the previous-mentioned image retention, the inventors have found a tendency that, immediately before the completion of the growth of the amorphous silicon nitride film based on the above-mentioned process conditions, the image retention is liable to be easily resolved corresponding to the increase of the ratio of the supply amount of monosilane gas (or the silicon compound gas which is capable of substituting the monosilane gas) into the plasma with respect to the supply amount of the ammonia gas (or nitride gas which is capable of substituting the ammonia gas). Particularly, on a display screen of a liquid crystal display panel in which the protective film is formed by setting the supply amount of the monosilane gas (or the silicon compound gas which is capable of substituting the monosilane gas) into the plasma larger than the supply amount of the ammonia gas (or the nitride gas which is capable of substituting the ammonia gas), the image retention at the time of completion of the operation can be substantially ignored. Accordingly, in this embodiment, the inventors have formed the new silicon nitride film 8a on the conventional silicon nitride film 8b under the conditions shown in Table 1. The detail of the protective film having such a two-layered structure is described later.

Step 10: As mentioned above, on the upper surface of the protective film having the two-layered structure which is formed on the portion of the TFT substrate which corresponds at least to the display region of the liquid crystal display panel, an orientation film 9 which is made of organic material such as polyimide is formed. When the TFT substrate is assembled into the liquid crystal display panel, the orientation film is brought into contact with the liquid crystal layer. Accordingly, by providing a mechanical treatment such as rubbing to the upper surface of the orientation film or irradiating light having specific polarizing components to the upper surface of the orientation film, the liquid crystal molecules which are brought into contact with the orientation film are oriented in the desired direction. In this embodiment, the treatment which gives the property to orient the liquid crystal molecules to the upper surface of the orientation film is performed before laminating the TFT substrate and the counter substrate to each other. Accordingly, at a point of time that the treatment of the upper surface of the orientation film 9 is completed, the TFT substrate having the cross-section shown in FIG. 2 is completed. Here, when the rubbing treatment is applied to the orientation film 9, the orientation film is baked thereafter.

Figure 4:
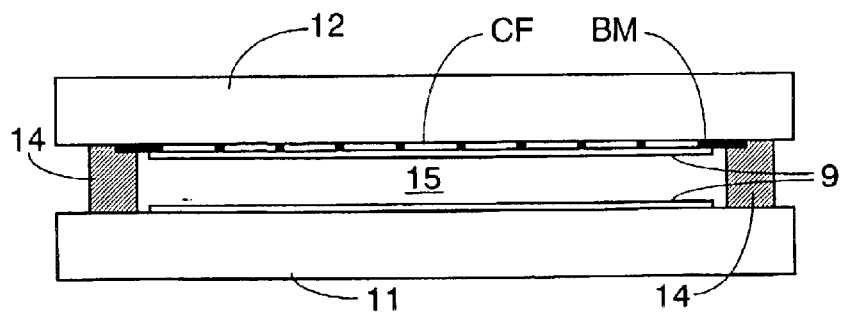
FIG. 4 is an explanatory view which schematically shows a liquid crystal display panel in cross section.

Subsequently, the counter substrate is laminated to the TFT substrate which is produced in the above-mentioned manner so as to complete an in-plane switching type liquid crystal display device. FIG. 4 schematically depicts the cross-section of the completed liquid crystal display panel. In the drawing, with respect to the TFT substrate 11 having the pixel structure shown in FIG. 1 and the cross-section shown in FIG. 2, all components including thin films which are formed on the main surface are omitted except for the orientation film 9. On the other hand, on a main surface of the counter substrate 12 which faces the TFT substrate 11 in an opposed manner, the above-mentioned black matrix BM is formed and a color filter CF is formed in an opening (see FIG. 1) for every pixel. Accordingly, in observing the liquid crystal display panel macroscopically, the black matrix BM and the color filters CF are depicted such that they are substantially arranged on the same layer with respect to the main surface of the counter substrate 12. The counter substrate 12 which forms the color filters on the main surface thereof is also referred to as a color filter substrate. Over the black matrix BM and the color filters CF, a protective film (also referred to as an overcoat film, not shown in the drawing) is formed, and an orientation film 9 is formed over the protective film in the same manner as the TFT substrate. Here, in the in-plane switching type liquid crystal display device according to this embodiment, each pixel region (region through which light transmits) is constituted such that the pixel electrodes and the counter electrodes are arranged in a spaced-apart manner from each other on the main surface of the TFT substrate 11 as shown in FIG. 1 and hence, electrodes are not formed on a main surface of the counter substrate 12. The summary of assembling steps of this type of liquid crystal display device is explained hereinafter.

To a periphery of at least one of the main surfaces of the TFT substrate 11 and the counter substrate 12 which are arranged to face each other in an opposed manner, a tacky organic material which is referred to as a sealing material is applied. Subsequently, as shown in FIG. 4, the TFT substrate 11 and the counter substrate 12 are overlapped to each other, the peripheries of both main surfaces are adhered to each other using the sealing material and, thereafter, the sealing material is hardened by annealing or the like. The sealing material is applied to the main surfaces such that the sealing material substantially surrounds a portion (portion where the pixels and the color filters are formed) which constitutes the display region of the main surface of at least one of the TFT substrate 11 and the counter substrate 12. Accordingly, in a state that the TFT substrate 11 and the counter substrate 12 are laminated to each other, with respect to the cross-section of the liquid crystal display panel, as shown in FIG. 4, a space is defined by these main surfaces and the sealing material 14. A liquid crystal material (or a liquid crystal composition including a chiral agent or the like) 15 is filled into the space through openings (sealing openings) formed in the sealing material 14. Here, the resistivity of the liquid crystal material 16 used in this embodiment is $1 \times 10^{13}$ Ωcm.

Figure 5:
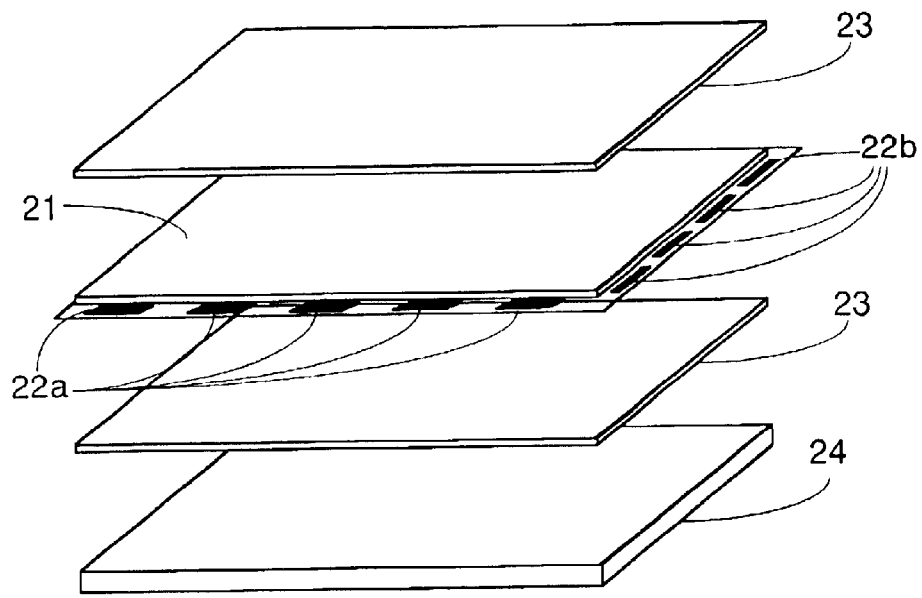
FIG. 5 is an exploded perspective view of the liquid crystal display device which incorporates a liquid crystal display panel 21 therein.

FIG. 5 is an exploded perspective view of the liquid crystal display device in which the liquid crystal display panel 21 produced in the above-mentioned manner is assembled. A portion of the periphery of the TFT substrate of the liquid crystal display panel 21 is projected to the outside from the counter substrate. On this projected portion, terminals to which driving circuits (external circuits with respect to the liquid crystal display panel) 22a, 22b which supply signals to the thin film transistors and the like disposed in the inside of the liquid crystal display panel 21 are electrically connected are formed (not shown in the drawing).

Polarizers 23 are respectively laminated to an upper surface and a lower surface of the liquid crystal display panel 21, a lower surface side of the liquid crystal display panel 21 is arranged to face a backlight unit 24 in an opposed manner, and the liquid crystal display panel 21 and the backlight unit 24 are fixed to each other thus substantially completing the liquid crystal display device. Although the backlight unit 24 is classified into a side edge type which uses a light guide plate and the like, a direct type which arranges a plurality of linear lamps to face the lower surface of the liquid crystal display panel 21 and the like, there is no restriction with respect to the backlight unit which can be adopted by this embodiment.

<<Effect with Respect to Suppression of Image Retention>>

The result of review related to the image retention alleviation characteristics of the in-plane switching type liquid crystal display device according to the above-mentioned first embodiment of the present invention is described hereinafter.

As has been described in conjunction with step 9 which describes the manufacturing method of TFT substrate used in the liquid crystal display device, the inventors have produced four types of TFT substrates which differ in the thickness of the amorphous silicon nitride film 8a which is newly provided onto the amorphous silicon nitride film 8b which is formed as the conventional protective film. The film thicknesses of the silicon nitride films 8a formed on these four types of TFT substrate are respectively 0 nm (conventional TFT substrate having no silicon nitride film 8a), 10 nm, 20 nm and 30 nm. The performance of four kinds of liquid crystal display devices which are produced using respective TFT substrates is compared using two kinds of evaluation criteria which are described hereinafter.

The comparison using either one of these criteria is based on the fact that the difference between the reference voltage (voltage Vcom applied to the counter electrode 3a, also referred to as a common voltage) immediately before changing over an image displayed on the display screen of the liquid crystal display panel and the reference voltage immediately after changing over the image determines time during which the image retention occurs on the display screen. That is, the difference in the reference voltage between before and after the changeover of the display image is reduced (alleviated) along with a lapse of time from the changeover of the display image. The inventors focused their attention on this phenomenon, measured the alleviation time necessary for alleviating the above-mentioned difference in reference voltage, and evaluated the image retention. The reference voltage Vcom which is described hereinafter implies a voltage which is applied to the counter electrode 3b, the gate voltage implies a voltage applied to the gate electrode 1a, and the drain voltage implies a voltage applied to the drain electrode 2a.

[Evaluation A]

In the liquid crystal display panel, the counter electrode 3a at the time of performing a black display (minimizing the optical transmissivity of the liquid crystal layer) on the display screen is set to a ground potential. In other words, the image display of the liquid crystal display panel is performed by a driving method (for example, a dot inversion driving) which is different from a so-called common inversion driving which changes the potential of the counter electrode 3a every image display of 1 frame. When the power supply of the liquid crystal display panel in such an operation state is turned off, due to the potential difference between the pixel electrode 6 and the counter electrode 3a immediately before the turning off of the power supply, the charge generated in the protective film 8 positioned between the electrodes is stored in the protective film 8 due to the reference voltage of the counter electrode 3a. Accordingly, as soon as the power supply of the liquid crystal display panel is turned off, the protective film 8 assumes a so-called charged state. The potential of the protective film 8 is increased correspondingly and hence, the optical transmissivity of the liquid crystal layer which faces the protective film 8 while sandwiching the orientation film 9 between the protective film 8 and the liquid crystal layer is also increased. Accordingly, the display screen of the liquid crystal display device temporarily performs the white display or exhibits the luminance close to the white display. In this specification, "white display" implies not only the case in which the optical transmissivity of the liquid crystal layer assumes the maximum value within a range of gray scale voltage applied to the liquid crystal layer but also an operation which displays color other than white (for example, gray) when the optical transmissivity is higher than that of the above-mentioned "black display" state.

Due to turning-off of the operation of the liquid crystal display panel, the charge stored in the above-mentioned protective film 8 is decreased due to leaking from the protective film 8 along with a lapse of time from a point of time that the operation of the liquid crystal display panel is turned off so that the charged state of the protective film 8 is also alleviated. Accordingly, the reference voltage from the counter electrode 3a which is connected to the ground potential is applied to the liquid crystal layer without being interrupted by the residual charge in the protective film 8 so that the optical transmissivity of the liquid crystal layer is gradually lowered whereby the display screen of the liquid crystal display panel is also changed to the black display.

Here, the luminance of the display screen (or the pixels arranged on the display screen) of the liquid crystal display panel is measured and the image retention alleviation characteristics of the above-mentioned four liquid crystal display panels are respectively evaluated based on time necessary for halving the maximum luminance value (also referred to as white luminance) measured immediately after turning off the power supply of the liquid crystal display panel. To be more specific, the light receiving element is made to face a specific portion of the liquid crystal display panel in an opposed manner and a so-called stationary measurement which continuously monitors the change of the luminance of the portion is performed. The shorter the time from a point of time that the above-mentioned maximum luminance value (white luminance) is measured to a point of time that the half value is measured, it is evaluated that the protective film formed on the liquid crystal display panel exhibits the more favorable image retention alleviation characteristics.

The evaluation of four kinds of liquid crystal display devices which respectively include the protective films (amorphous silicon nitride films) 8a having film thicknesses 0 nm, 10 nm, 20 nm, 30 nm is performed by preparing two sets of liquid crystal display panels for each kind.

First of all, the image retention alleviation times of two sets of liquid crystal display panels in which the film thickness of the protective film 8a is 0 nm (having no protective film 8a) are 125 seconds and 114 seconds respectively. Then, the image retention alleviation times of two sets of liquid crystal display panels in which the film thickness of the protective film 8a is 10 nm are 105 seconds and 92 seconds respectively and hence, a slight effect is confirmed.

Further, both of two sets of liquid crystal display panels in which the film thickness of the protective film 8a is 20 nm and two sets of liquid crystal display panels in which the film thickness of the protective film 8a is 30 nm exhibit the image retention alleviation time of approximately 0 second thus proving the remarkable enhancement of the image retention alleviation characteristics. Here, the image retention alleviation time of approximately 0 second implies that the time required from a point of time that the maximum value of luminance is measured to a point of time that the half value of the maximum luminance is measured is extremely short, that is, less than 1 second and hence, the measurement is substantially impossible with the measuring method adopted by the inventors. In any case, it is confirmed that the formation of the protective film 8a on the protective film 8b brings about the large improvement of the image retention alleviation characteristics.

[Evaluation Method B]

In FIGS. 1 and 2, a DC voltage 10 V is applied to the gate electrode 1a, a voltage having a rectangular wave pattern which fluctuates an amplitude thereof within a range of 3 to 4 V is applied to the drain electrode 2a, and the counter electrode 3a is connected to the ground potential. In this state, a DC voltage 1 V is applied to the drain electrode 2a so as to fluctuate the above-mentioned rectangular wave voltage within a range of 4 to 5 V. In this manner, the time-sequential change of luminance (relative flicker) which is generated when the center of the amplitude of the rectangular voltage waveform which is applied to the drain electrode 2a is elevated is measured. As a specific measuring method, for example, the luminance monitoring of the liquid crystal display panel can be used in the same manner as the above-mentioned evaluation method A. In this evaluation method, the attenuation of the luminance of the liquid crystal display panel is measured from a point of time that the above-mentioned DC components are applied to the drain electrode 2a. As described above, even when the DC components are added to the potential of the drain electrode 2a, an extra charge is generated in the protective film 8 and this extra charge remains in the protective film 8 and hence, an image to be erased from the display screen remains on the display screen as "image retention". The relative flicker intensity reflects also the intensity which generates the image to be erased on the display screen and hence, the evaluation of image retention can be performed based on the relative flicker intensity. That is, the liquid crystal display panel having the relative flicker intensity which drops to 0 as fast as possible is determined as a liquid crystal display panel having the favorable image retention alleviation characteristics.

Figure 6:
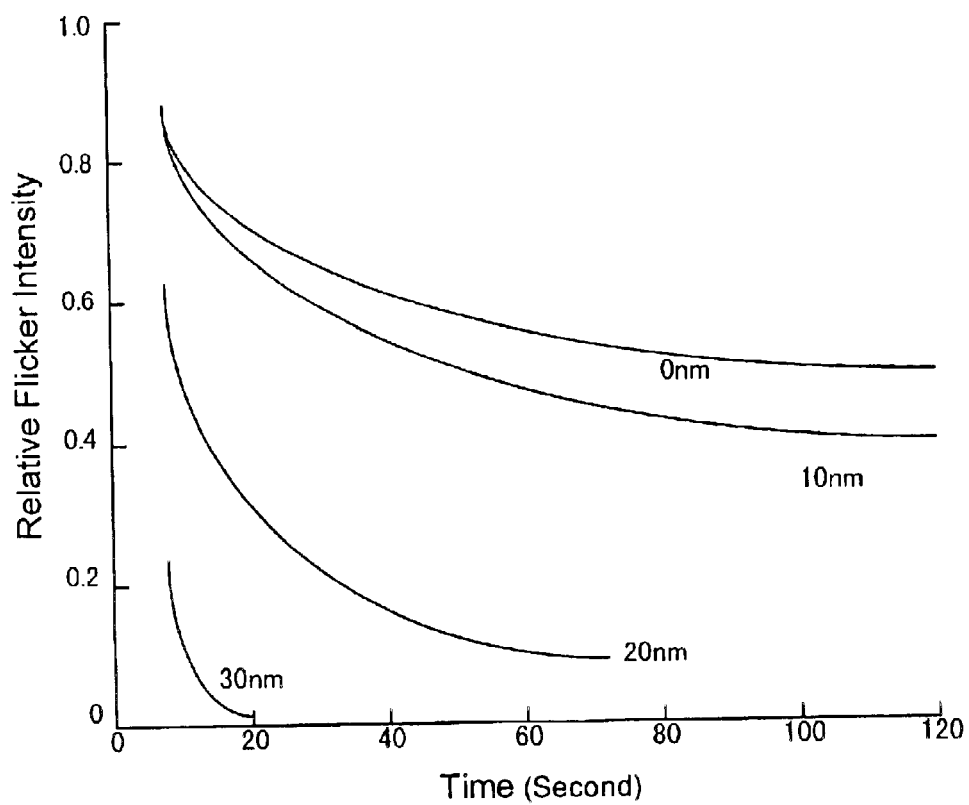
FIG. 6 is a graph showing a result of evaluation of image retention alleviation characteristics of the in-plane switching type liquid crystal display device of the embodiment 1 of the present invention obtained by the relative flicker intensity measurement at backlight luminance: 25 $Cd/m^2$.
Figure 7:
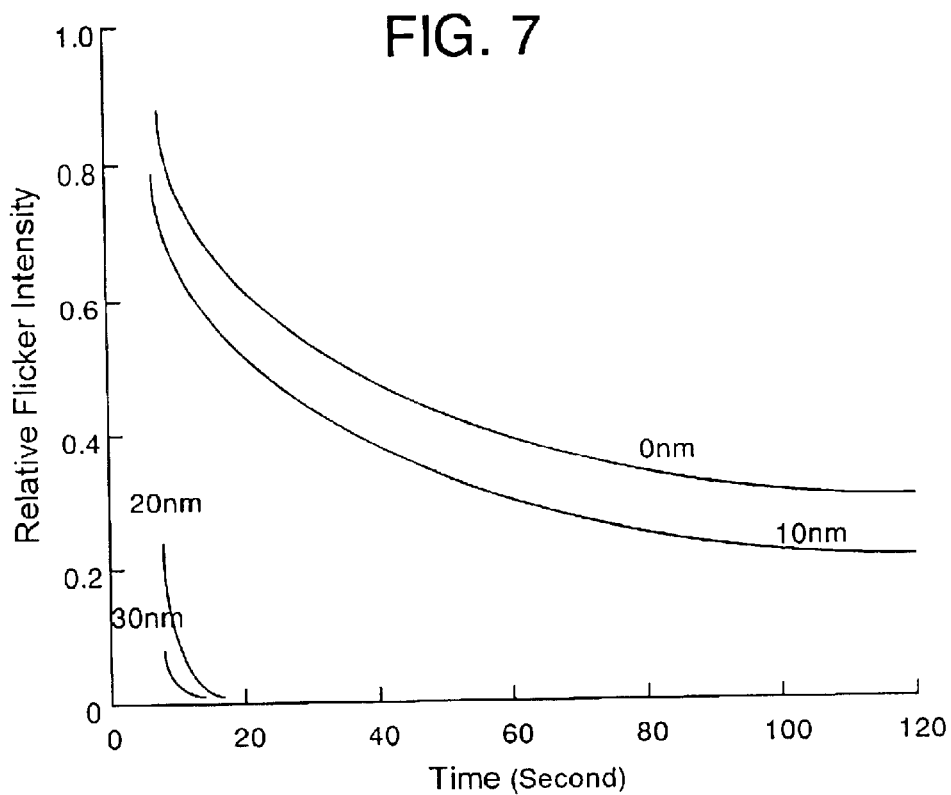
FIG. 7 is a graph showing a result of evaluation of image retention alleviation characteristics of the in-plane switching type liquid crystal display device of the embodiment 1 of the present invention obtained by the relative flicker intensity measurement at backlight luminance: 250 $Cd/m^2$.

In the same manner as the above-mentioned evaluation method A, the evaluation method B is also performed such that four kinds of liquid crystal display devices (provided with backlight units) which respectively include the protective films (amorphous silicon nitride films 8a) having film thicknesses 0 nm, 10 nm, 20 nm, 30 nm are prepared two sets for each kind. The measurement is performed by setting the luminance of the backlight unit of the liquid crystal display device to 25 Cd (candela)/m$^2$ and 250 Cd/m$^2$ respectively and the result of these two kinds of experiments are shown in FIG. 6 (backlight luminance=25 Cd/m$^2$) and FIG. 7 (backlight luminance=250 Cd/m$^2$).

From the result of the evaluation, the improvement of the image retention alleviation characteristics of the liquid crystal display device derived from the formation of the protective film 8a on the protective film 8b is confirmed. Further, it is confirmed that the image retention alleviation characteristics are remarkably enhanced when the thickness of the protective film 8a is set to a value equal to or more than 20 nm. Further, to compare the graph shown in FIG. 6 with the graph shown in FIG. 7, all characteristics curves in the graph shown in FIG. 7 measured by setting the backlight luminance to high values exhibit favorable image retention alleviation characteristics than the characteristics curves shown in the graph of FIG. 6. Based on such a tendency, the inventors of the present invention had an understanding that the photo conduction generated on the protective film 8, particularly protective film (amorphous silicon nitride film) 8a which is newly formed on the TFT substrate in accordance with the present invention promotes the discharge of residual charge from the protective film 8 so that the image retention alleviation with respect to the liquid crystal display device is enhanced.

<<Features of Protective Film>>

As described above, one example of the liquid crystal display device according to the present invention exhibits the favorable image retention alleviation characteristics by adopting the protective film having the novel structure. Accordingly, the structural features and the physical properties of the protective film are explained hereinafter from various viewpoints.

The above-mentioned novel protective film is, as explained in step 9 of the TFT substrate manufacturing process of the liquid crystal display device according to the first embodiment of the present invention, is constituted of the two-layered amorphous silicon nitride film. This two-layered silicon nitride film is prepared as an experiment sample having a film thickness of 200 nm using the above-mentioned vapor deposition apparatus and the physical properties and chemical compositions of respective silicon nitride films are arranged in Table 2.

TABLE 2

| Parameter | silicon nitride film 8b | silicon nitride film 8a |
|---|---|---|
| $Si_xN_y$- composition ratio (ratio of y/x) | 1.28 | 0.91 |
| Relative dielectric constant | 6.5 | 9.4 |
| Dark resistivity (unit: $\Omega cm$) | $3 \times 10^{15}$ | $3 \times 10^{13}$ |
| Photo resistivity (unit: $\Omega cm$) | $1 \times 10^{15}$ | $1 \times 10^{9}$ |

In Table 2, dark resistivity is the resistivity of the amorphous silicon nitride film measured in a darkroom and is measured under the same conditions as dark resistivity of selenium photocell or an optical electronic device similar to the selenium photocell. On the other hand, photo resistivity is the resistivity of the silicon nitride film when the photo conduction is generated in the inside of the silicon nitride film by irradiating light to the amorphous silicon nitride film. The photo sensitivity is measured by irradiating white light of 500 kLx (kilo lux) to respective silicon nitride films. Here, 1 Lx (lux) indicates the illuminance when the luminous flux of 1 Lm (lumen) is incident on a surface of 1 $m^2$ and lux and lumen have the relationship which is expressed by an equation 1 Lx=1 $Lm/m^2$. Further, the luminous intensity I of a point source which emits the luminous flux of F[Lm] at a solid angle $\omega$ is expressed by the previous-mentioned unit 1 Cd (candela), wherein there exists a relationship I[Cd]=dF/d$\omega$(=F/$\omega$: when $\omega$ is extremely small). For reference purpose, the total luminous flux F which is irradiated at a full solid angle $4\pi$ from a uniform point source which exhibits the uniform luminous intensity in all directions is expressed by F=$4\pi$I[Lm]. In the transmission type liquid crystal display device, light emitted from a light source such as a backlight unit, a front light unit or the like is incident on the main surface of the liquid crystal display panel, while in the reflection type liquid crystal display device, light which is incident on the main surface of the liquid crystal display panel from the outside is reflected in the inside of the liquid crystal display panel and is irradiated from the main surface. Accordingly, in both cases, the protective film is subjected to a considerable amount of light. The inventors have reviewed this fact along with the above-mentioned finding on "effect with respect to image retention suppression" of the liquid crystal display device according to the present invention, and have studied the possibility that the photo conduction generated in the novel silicon nitride film 8a contributes to the reduction of image retention of the liquid crystal display device due to the formation of the novel silicon nitride film 8a on the (liquid crystal layer side of the) silicon nitride film 8b shown in FIG. 2.

The inventors have reviewed this possibility using several kinds of silicon nitride films 8a which are produced by changing the growth conditions in accordance with the plasma enhanced CVD method. First of all, in the step for forming the silicon nitride film 8a on the silicon nitride film 8b, high frequency power (also referred to as radio frequency power or RF power in view of a frequency band thereof) which generates plasma in the inside of the vapor deposition apparatus is changed thus producing several kinds of liquid crystal display devices. The high frequency power is applied from the electrode ELCT to plasma in the vapor deposition apparatus shown in FIG. 3.

Figure 8:
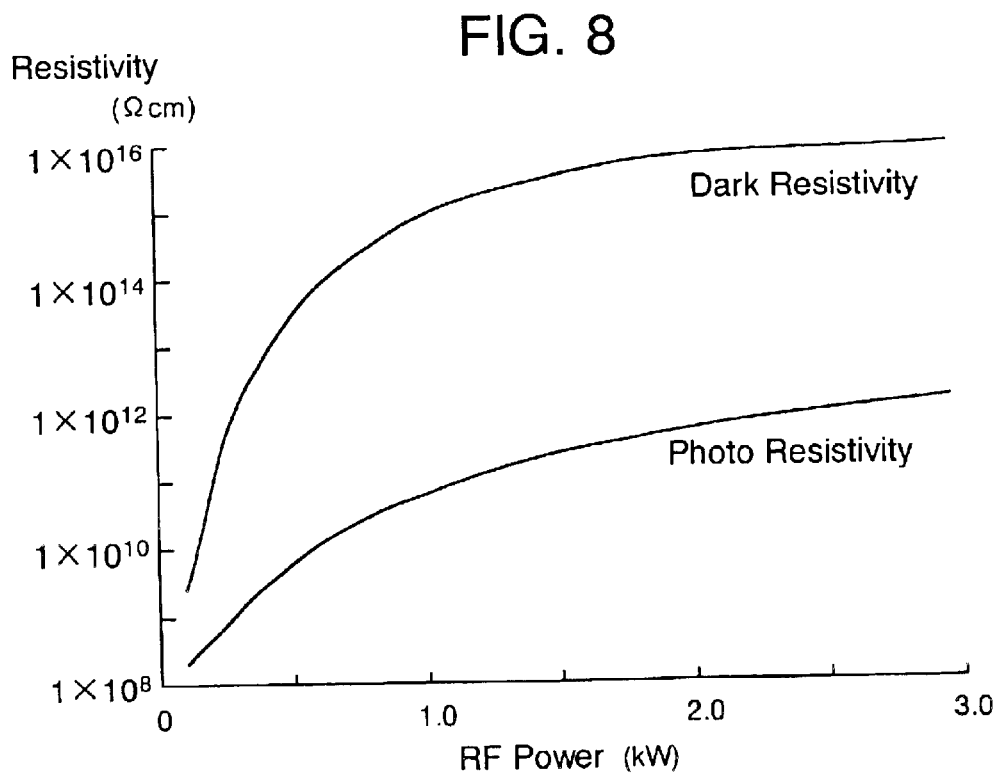
FIG. 8 is a graph showing the correlation between a growth condition (high frequency electric power applied to plasma), dark resistivity and photo resistivity of an amorphous silicon nitride film 8a formed on a liquid crystal layer side of a protective film 8 according to the embodiment 1 of the present invention.

As a result of comparison of the image retention alleviation characteristics of these liquid crystal display devices, a result that the smaller the high frequency power at the time of growing the silicon nitride film 8a, the image retention alleviation characteristics are enhanced. Further, several kinds of test samples of silicon nitride films 8a are prepared by changing the high frequency power applied to the plasma in the same manner, and the dark resistivity and the photo resistivity of these test samples are examined and the result shown in FIG. 8 is obtained. It is found from the result that corresponding to the decrease of the high frequency power which is applied at the time of growth of the silicon nitride film 8b in response to the image retention alleviation characteristics of the liquid crystal display devices, the resistivities of these test samples are also reduced.

Figure 9:
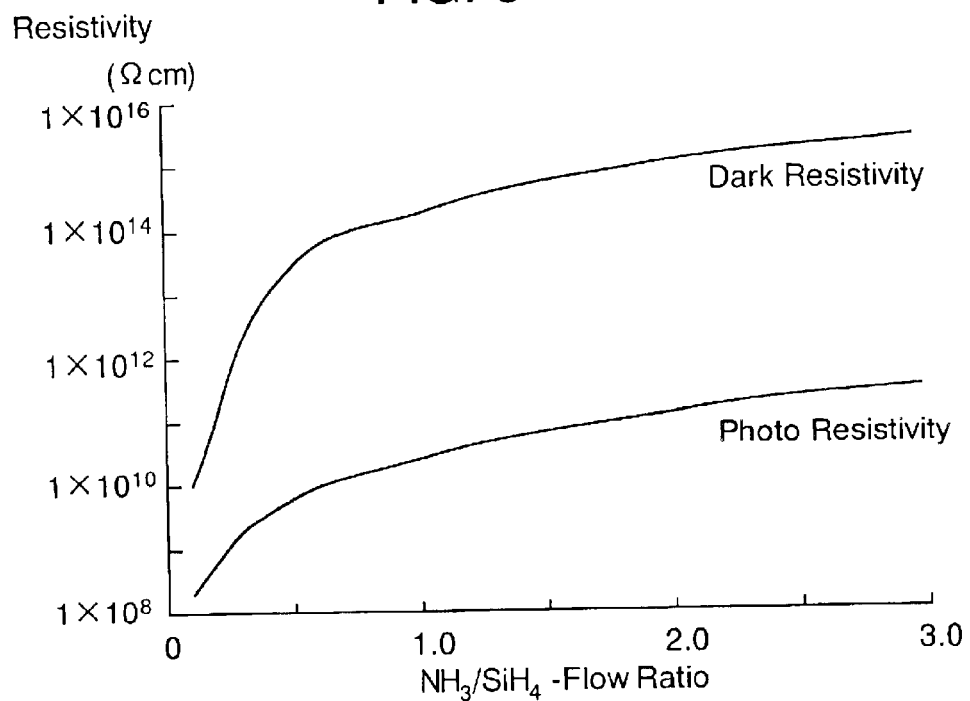
FIG. 9 is a graph showing the correlation between a growth condition (supply ratio of raw material gases), dark resistivity and photo resistivity of an amorphous silicon nitride film 8a formed on a liquid crystal layer side of a protective film 8 according to the embodiment 1 of the present invention.

Subsequently, based on the above-mentioned result, the high frequency power is set to 350 W, the raw material gas flow rate ratio of $SiH_4$ and $NH_3$ supplied to the CVD device (vapor deposition apparatus ($NH_3$ flow rate/$SiH_4$ flow rate) at the time of growth of the silicon nitride film 8a is changed thus producing several kinds of test samples of silicon nitride films 8a. The dark resistivity and the photo resistivity of these test samples are measured in the above-mentioned manner and the correlation between these resistivities and the above-mentioned raw material gas flow rate ratio is plotted thus obtaining a result indicated in the graph shown in FIG. 9. Further, several kinds of liquid crystal display devices are produced by forming the silicon nitride film 8a on the silicon nitride film 8b by respectively changing the raw material gas flow rate ratio in the same manner as the test samples and the image retention alleviation characteristics are examined. As the result, the smaller the raw material gas flow rate ratio (the $SiH_4$ flow rate being increased with respect to the $NH_3$ flow rate) during the growth period of the silicon nitride film 8a, the image retention promptly disappears from the display screen of the liquid crystal display device which includes the silicon nitride film 8a as one of protective films. Further, the inventors also have found an example in which in controlling the resistivity of the silicon nitride film 8a, it is preferable to produce the silicon nitride film 8a by setting the above-mentioned raw material gas flow rate ratio ($NH_3$ flow rate/$SiH_4$ flow rate) to not more than 1.0, that is, by setting the $SiH_4$ flow rate not less than the $NH_3$ flow rate.

In view of the above, the inventors have found that in totally reviewing the relationship between the resistivities of the test samples of the silicon nitride films 8*a* produced by changing the growth conditions of the plasma enhanced CVD method and the image retention alleviation characteristics of the liquid crystal display devices which are respectively provided with these silicon nitride films 8*a*, the relationship between the resistivities of the silicon nitride films 8*a* and the resistivities of the liquid crystal layers influences the image retention alleviation characteristics. The resistivities of the liquid crystal layers substantially fall within a range of $1 \times 10^{11}$–$1 \times 10^{13}$ Ωcm although the values may change depending on the kinds of liquid crystal display devices. On the other hand, focusing on the photo resistivities shown in FIG. 8 and FIG. 9, it is considered that in the inside of the silicon nitride film 8*a* which is exposed to light incident from the lighting unit of the liquid crystal display device or an external source of the liquid crystal display device, photo conduction is generated to some extent so that the resistivity of the silicon nitride film 8*a* becomes lower than the resistivity of the liquid crystal layer.

For example, to compare the liquid crystal display device having the protective film consisting only of the silicon nitride film 8*b* shown in Table 2 and the liquid crystal display device having the protective film which adds the silicon nitride film 8*a* to the liquid crystal layer side of the silicon nitride film 8*b*, it is concluded that with respect to the former liquid crystal display device, the charge generated on the liquid crystal layer side of the silicon nitride film 8*b* is not discharged in spite of the conductive property of the liquid crystal layer and remains on the surface for a long time, while with respect to the latter liquid crystal display device, such a charge is promptly discharged due to the conductive property of the silicon nitride film 8*a* which is brought into contact with the liquid crystal layer side of the silicon nitride film 8*b*. Accordingly, not to mention the silicon nitride film, it is one of the criteria that with respect to at least two kinds of material layers which constitute the protective film, the resistivity, that is, for example, the photo resistivity of material layer at the liquid-crystal-layer side is set lower than the resistivity of the material layer at the active-element side (silicon nitride film 8*b* in the first embodiment). However, when the resistivity of the material layer at the liquid-crystal-layer side is excessively low, the drawback which is pointed out in conjunction with the example described in the previously-mentioned Japanese Patent 2938521 occurs. Accordingly, the inventors proposes the following criteria with respect to the formation of the material layer at the liquid crystal layer side which constitutes the protective film (in other words, a layer which is made remote from the active elements or switching elements due to another protective film material layer).

One of the criteria is to set the resistivity of the material layer greater than the resistivity of the semiconductor layer. According to the review carried out by the inventors, the amorphous silicon film described in Japanese Patent 2938521 exhibits the dark resistivity of $1 \times 10^{10}$ to $10^{11}$ Ωcm and the photo conductivity of $1 \times 10^6$ to $10^7$ Ωcm (with respect to white light irradiation of 500 kLx). To the contrary, according to the finding obtained through the experiment, the above-mentioned drawback can be obviated by setting the resistivity (photo resistivity) of the liquid-crystal-layer-side material layer with respect to the white light irradiation of 500 kLx to not less than $1 \times 10^8$ Ωcm. Further, the dark resistivity of the liquid-crystal-layer-side material layer may be set greater than $1 \times 10^{11}$ Ωcm.

Another criterion focuses on the relative dielectric constant from a viewpoint that it is preferable to make the liquid-crystal-layer-side material layer hold the properties equal to or close to the properties of an insulator. It is recommendable that the relative dielectric constant of the protective film material layer formed at the liquid crystal layer side is greater than the relative dielectric constant of the silicon nitride film 8*b* (6.5) shown in Table 2 and is lower than the relative dielectric constant of the amorphous silicon film (within a range from 10 to 13). For example, it is preferable that the relative dielectric constant of the material layer at the liquid crystal layer side is set to a value within a range from not less than 7 to less than 10 and the conductive property of the material layer at the liquid crystal layer is set to a value higher than the conductive property of the protective film material layer formed at the active element side and lower than the conductive property of the semiconductor.

Further, when the protective film material layer at the liquid crystal layer side is formed of the silicon nitride film reviewed in the above-mentioned first embodiment, in the composition expressed by a chemical structural formula of $Si_xN_yX_z$ (X being a general term of other constitutional element), it is preferable that a condition $0 < y/x \leq 1.0$ is satisfied. Here, even when X which is picked up as the general term of element other than silicon and nitrogen is not present (even z=0), the exercise of the present invention is not obstructed. Although the composition of silicon nitride is expressed as $Si_3N_4$ (approximately 1.3 in the above-mentioned y/x ratio) stoichiometrically, to the contrary, the composition of the novel protective film which is added to the liquid crystal layer side in the liquid crystal display device according to the present invention becomes Si-rich. It is desirable that the silicon nitride film which constitutes the protective film is, for enhancing the insulation property of the material layer formed at the active element (switching element) side, formed as the amorphous film including the material layer at the liquid crystal layer side. One desirable example of the range of composition of the above-mentioned $Si_xN_yX_z$ (X being a general term of other constitutional element) from the viewpoint of insulation property is $0.5 < y/x \leq 1.0$.

Figure 10:
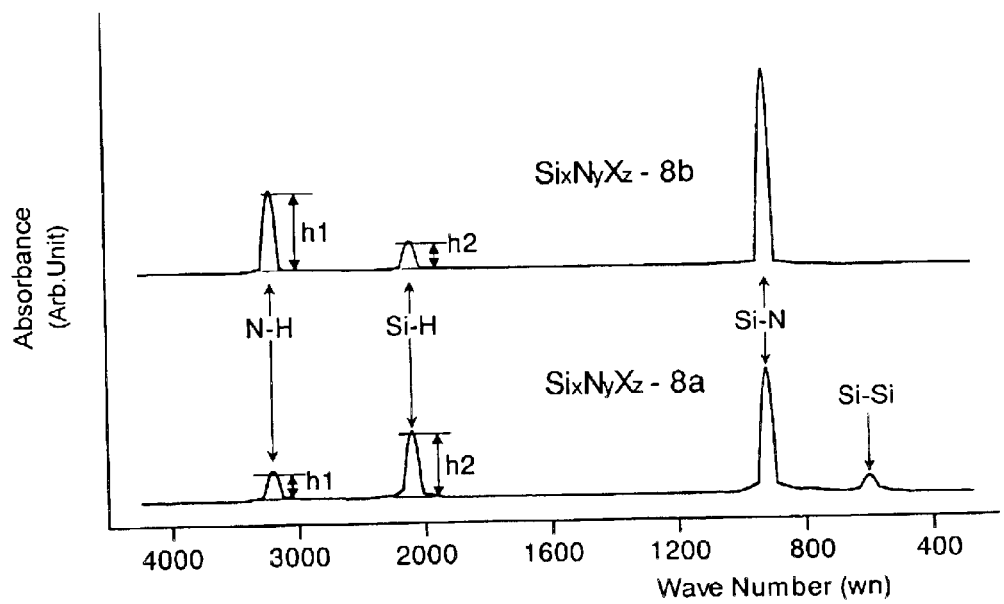
FIG. 10 is a view showing one example of infrared absorption spectra of an amorphous silicon nitride film 8a (lower side) formed on a liquid crystal layer side of a protective film 8 according to the embodiment 1 of the present invention and of an amorphous silicon nitride film 8b (upper side) formed on a switching element side of the protective film 8 according to the embodiment 1 of the present invention.

According to the finding which the inventors have obtained through the experiment in which the protective films were produced using silicon nitride, the N/Si ratio in respective compositions of the switching-element-side layer and the liquid-crystal-layer-side layer can be controlled at the above-mentioned raw material gas flow rate ratio (ratio of $NH_3$ flow rate/$SiH_4$ flow rate) and is also regarded to be substantially equal to such a raw material gas flow rate. Further, the compositions of the silicon nitride films 8*a*, 8*b* which constitute the protective film 8 illustrated in FIG. 2 can be identified using an analytic method such as the Fourier transform infrared spectroscopic method (FT-IR method) or the Rutherford backward scattering method (RBS method) or the like. In FIG. 10, one example of the result of analysis (spectrum) of the silicon nitride films 8*a*, 8*b* obtained by the FT-IR method is shown. With respect to these spectra, the wave number (unit: wn, 1 wn=1 $cm^{-1}$) of infrared rays irradiated to the protective film is taken on the abscissas and the absorbance (arbitrary unit) of infrared rays by the protective film is taken on the axis of ordinates. In both of the spectrum of the silicon nitride film 8*b* (SiN-8*b*) and the spectrum of the silicon nitride film 8*a* (SiN-8*a*), the absorbance due to the bonding of nitrogen and hydrogen (N—H) is observed in the vicinity of 3200 wn, the absorbance due to the bonding of silicon and hydrogen (Si—H) is observed in the range of 2000 to 2100 wn, and the absorbance due to the bonding of silicon and nitrogen (Si—N) is observed in the vicinity of 900 wn. However, compared with the spectrum of the silicon nitride film 8b (SiN-8b), with respect to the spectrum of the silicon nitride film 8a (SiN-8a), at least one of following features is observed.

Feature 1: The absorbance of the silicon-nitrogen bonding in the vicinity of 900 wn is small.

Feature 2: The ratio of absorbance h2 due to the silicon-hydrogen bonding in the range of 2000 to 2100 wn with respect to the absorbance h1 due to the nitrogen-hydrogen bonding in the vicinity of 3200 wn is increased so that the peak height of the absorbance h2 may be set equal to the absorbance h1 or exceeds the absorbance h1 (h1<h2).

Feature 3: The peak of infrared rays absorption due to the silicon-silicon bonding (Si—Si) is generated in the vicinity of 600 wn.

In FIG. 10, to show the spectrum of the silicon nitride film 8b (SiN-8b) and the spectrum of the silicon nitride film 8a (SiN-8a) in parallel, a base line of the former is shifted in the axis of ordinates from a base line of the latter. Further, the resistivity of the illustrated silicon nitride film 8a is set lower by at least two digits than $1 \times 10^{15}$ Ωcm which is the resistivity of the silicon nitride film 8b.

The protective film of the liquid crystal display device of the first embodiment according to the present invention has been discussed from three viewpoints of resistivity, relative dielectric constant and silicon nitride film heretofore. To observe this protective film from the liquid crystal layer side of the substrate (TFT substrate 11 in this embodiment) on which the protective film is formed, that is, from the uppermost surface of the thin film structure formed on the main surface of the substrate which faces the liquid crystal layer, the above-mentioned features are described as follows.

First of all, from a viewpoint of the resistivity, the above-mentioned protective film is characterized in that due to the irradiation of light to the surface which faces the liquid crystal layer, the resistivity can be reduced to not more than $\frac{1}{100}$ of the resistivity when the light irradiation is not performed. This feature can be confirmed, for example, by bringing a probe for measuring resistance into contact with an upper surface of the protective film and by irradiating light having illuminance of 500 kLx or more to the upper surface. One example of the resistivity of the upper surface of the protective film is in a range of $1 \times 10^{13}$ Ωcm–$1 \times 10^{15}$ Ωcm when the light is not irradiated to the upper surface of the protective film (for example, in a dark room) and is in a range of $1 \times 10^{9}$ Ωcm–$1 \times 10^{11}$ Ωcm when the light having the illuminance of 500 kLx or more is irradiated to the upper surface of the protective film.

Subsequently, from a viewpoint of relative dielectric constant, the surface of the protective film which faces the liquid crystal layer in an opposed manner (for example, the uppermost surface of the protective film) exhibits the relative dielectric constant of not less than 7.5. Further, according to one preferable example of the liquid crystal display device of the present invention, the surface of the protective film exhibits the relative dielectric constant of not less than 9.0.

Finally, from a viewpoint of forming the protective film using the material containing at least silicon and nitrogen ($Si_xN_yX_z$, X being a general term of other constitutional element), the composition ratio of nitrogen relative to silicon (y/x) of the surface of the protective film which faces the liquid crystal layer in an opposed manner (for example, the uppermost surface of the protective film) is in a range larger than 0 and not more than 1.0. In other words, the protective film has the liquid crystal side thereof formed of material having high silicon content based on the stoichiometric ratio of silicon nitride: $Si_3N_4$.

Any one of the above-mentioned features of the protective film grasped from the upper surface of the substrate is also provided with the feature that the protective film comes into contact with the switching elements. That is, while the protective film exhibits the low resistivity at the liquid crystal layer side, the protective film sufficiently suppresses short-circuiting and leaking of charge (electrons and positive holes) at the switching element side. The confirmation of the features brought about by the cross-sectional structure of the protective film according to the previously-mentioned invention in the manufacturing line of the liquid crystal display devices substantially constitutes a so-called destructive test of products. However, by forming the protective film according to the present invention on the TFT substrate, then by confirming the operation of the switching elements covered with the protective film, and thereafter by confirming at least one of described features from the uppermost surface (liquid-crystal-layer-side surface) of the protective film according to the present invention, it is possible to manage the quality of the liquid crystal display device according to the present invention in a manufacturing process by a non-destructive test.

The features of the protective film which is adopted by the liquid crystal display device of the first embodiment according to the present invention have been discussed from various viewpoints of resistivity, relative dielectric constant and silicon nitride film. However, even when the protective film adopts the three-or-more layered laminated structure which is formed by adding other material layers to the liquid-crystal-layer-side material layer (hereinafter referred to upper-side layer) and the switching-element-side material layer (hereinafter referred to as lower-side layer), the exercise of the present invention cannot be obstructed. For example, the protective film may be constituted by inserting a material layer which differs from both of the upper-side layer and the lower-side layer between the upper-side layer and the lower-side layer. Alternatively, the protective film may be constituted by forming a material layer which differs from the lower-side layer at the switching element side from the lower-side layer. Further, although it is ideal that the upper-side layer is formed as the uppermost layer of the protective film and exhibits the resistivity sufficiently smaller than the resistivities of the other material layers which constitute the protective film from a viewpoint of enhancing the image retention alleviation characteristics of the liquid crystal display device, the advantageous effects of the present invention are not damaged even when the protective film is constituted by forming a material layer which differs from the upper-side layer between the upper-side layer and the orientation film. The gist of the present invention lies in constituting the protective film by laminating the lower-side layer and the upper-side layer at least one of which satisfies the above-mentioned features sequentially in this order with respect to the main surface. Then, various features of the upper-side layer in view of the whole protective film are individually enumerated including the case in which the protective film is constituted by adding other layers to the above-mentioned upper-side layer and the above-mentioned lower-side layer.

For example, it is preferable to suppress the dark resistivity of the upper-side layer to not more than $\frac{1}{100}$ compared to the dark resistivity of other layer which constitutes the protective film. In other words, it is preferable to grow the upper-side layer such that the upper-side layer exhibits the dark resistivity which is two digits smaller than the dark resistivity of the layer among the material layers other than the upper-side layer included in the protective film which exhibits the lowermost dark resistivity.

In another example, it is preferable to form the layer other than the upper-side layer and the lower-side layer which constitutes the protective film together with the upper-side layer such that the photo resistivity thereof becomes not more than 1/100 of the dark resistivity thereof.

In still another example, it is preferable that the film thickness which is a sum of the film thickness of the upper-side layer and the film thickness of at least one layer other than the upper-side layer which is formed on the lower-side layer is set to not more than one half of the film thickness of the whole protective film. It is more preferable that the film thickness of at least one layer which is formed at the liquid crystal layer side (or the orientation film side) than the lower-side layer of the protective film is set to not less than 10 nm.

In still another example, it is preferable that at least one layer which is formed at the liquid crystal layer side (or the orientation film side) than the lower-side layer of the protective film exhibits the photo resistivity lower than the photo resistivity of the liquid crystal layer. It is more preferable that such one layer exhibits the dark resistivity lower than the dark resistivity of the liquid crystal.

With respect to the above-mentioned protective film, the respective material layers which constitute the protective film may be formed by other chemical vapor deposition method besides the above-mentioned plasma enhanced CVD method. Further, in any chemical vapor deposition method, by laminating the material layers which continuously differ in chemical composition while suitably changing supply amounts of raw material gases and vapor deposition conditions, the operation efficiency of the liquid crystal display device is also enhanced.

In producing the protective film by the chemical vapor deposition method using the plasma CVD device, it is preferable to change the high frequency power (applied to plasma) with respect to the total flow rate of the raw material gases ($SiH_4$ gas and $NH_3$ gas in case of $Si_xN_y$ film) supplied to a reaction chamber (housing CHMB illustrated in FIG. 3) corresponding to respective films to be formed. This physical quantity is defined as a so-called "RF power per unit gas flow rate" which is obtained by dividing the high frequency power applied to plasma with the sum of flow rates of the raw material gases. It is preferable to set the RF power value per unit gas flow rate at the time of above-mentioned growth of the upper-side layer smaller than the corresponding RF power value at the time of growth of the lower-side layer. While the lower-side layer in which priority is given to insulation property is formed such that the lower-side layer exhibits the resistivity of not less than $1 \times 10^{15}$ Ωcm, for example, it is recommendable that the upper-side layer is formed such that the upper-side layer exhibits the resistivity similar to the resistivity of the semi-insulating semiconductor such as ZnS or GaAs. It is desirable that the resistivity of the upper-side layer is approximately two digits or more lower than the resistivity of the lower-side layer. In laminating these two kinds of material layers continuously, the vapor deposition condition control in the vicinity of an interface between the lower-side layer and the upper-side layer determines the properties of the whole protective film. By properly controlling at least one of the total flow rate of the raw material gases and the power applied to plasma, the vapor deposition conditions in the vicinity of the interface can be surely changed over so that it is possible to set the resistivity of the upper-side layer in the above-mentioned desired range. Particularly, by setting the thickness of the upper-side layer smaller than the thickness of the lower-side layer, this advantageous effect is enhanced.

Further, it is preferable that the protective film is formed on at least one of the switching elements and the black matrix. Due to such a provision, for example, the undulation which may be generated on the main surface of the substrate due to any one of the switching elements, the black matrix and the color filters can be leveled by the upper-side layer. Accordingly, in forming the orientation film or the electrode film on the protective film, the orientation direction of the liquid crystal molecules in the liquid crystal layer with respect to the upper surface of the orientation film can be surely controlled. As the switching elements, thin film diodes may be used besides the thin film transistors exemplified in the first embodiment. Further, besides the bottom gate structure which forms the channel layers made of semiconductor films on the gate electrodes shown in FIG. 2, the thin film transistors may adopt the top gate structure in which the gate electrodes are formed on the channel layers made of semiconductor films. Further, the semiconductor films are not limited to the above-mentioned amorphous silicon thin films. That is, even when the semiconductor films are formed of poly-crystalline silicon thin films or the silicon thin films having pseudo single crystal which increases the grain size of the poly-crystalline grain particles, the exercise of the present invention is not obstructed.

On the other hand, by forming the above-mentioned protective film over the pixel electrodes or over the pixel electrodes and the counter electrodes, the above-mentioned advantageous effect becomes more remarkable. For example, even when the above-mentioned protective film is applied to a liquid crystal display device which drives the liquid crystal by fringe field switching besides the above-mentioned in-plane-switching liquid crystal display device, it is possible to obtain the advantageous effects.

To focus on the photo conduction which is generated in at least one layer (the above-mentioned upper-side layer) which is formed at the liquid crystal layer side than the lower-side layer of the protective film, by applying the protective film to a liquid crystal display device provided with a light source device which irradiates a liquid crystal display panel (a light source which is referred to as a backlight unit or a front light unit), the image retention alleviation property can be enhanced by an operation to turn on the light source.

Some of modifications of the protective film provided to the liquid crystal display device according to the present invention which has been explained heretofore are introduced in the second embodiment and the third embodiment.

<<Second Embodiment>>

Figure 11:
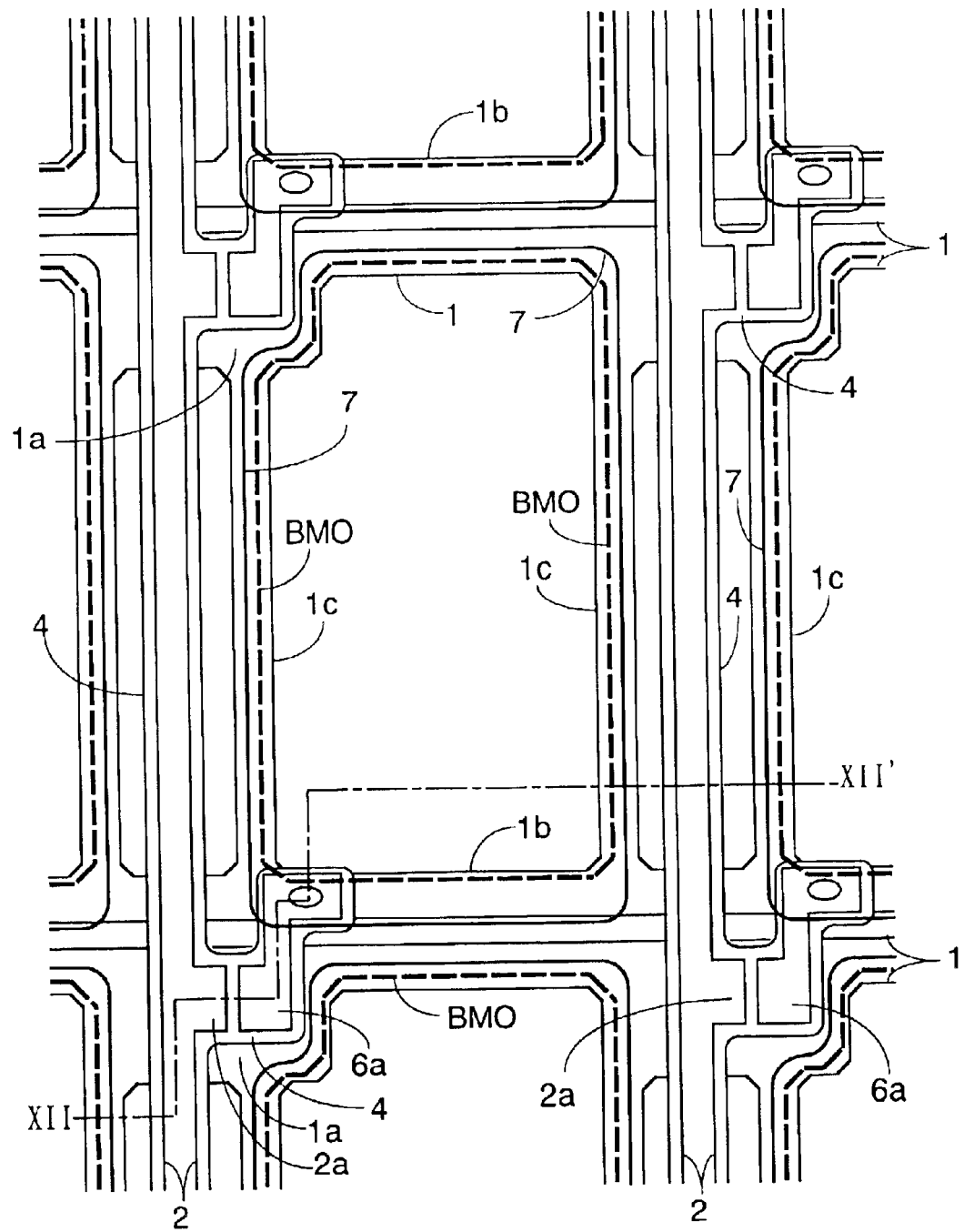
FIG. 11 is a plan view showing one of a plurality of pixels formed on a TN type liquid crystal display device (liquid crystal display panel) according to the second embodiment of the present invention in an enlarged form.
Figure 12:
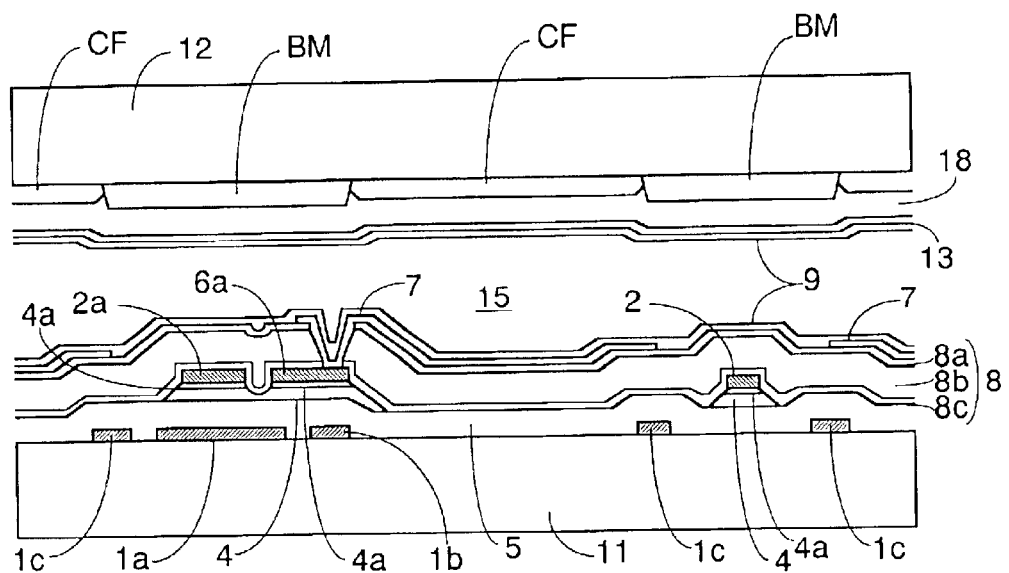
FIG. 12 is a cross-sectional view obtained by cutting a TFT substrate along a chain line XII–XII' in FIG. 11.

As the second embodiment of the liquid crystal display device, a twisted nematic (also referred to as TN) type liquid crystal display device having the above-mentioned protective film is explained mainly in conjunction with FIG. 11 and FIG. 12. The constitution which makes the liquid crystal display device of this embodiment different from the liquid crystal display device of the first embodiment in structure lies in that pixels each having a switching element are formed on one of a pair of substrates which are arranged to face each other in an opposed manner with main surfaces thereof spaced apart from each other (a liquid crystal layer 15 being sealed between the main surfaces of these substrates 11, 12 as shown in FIG. 4), and counter electrodes are formed on the other substrate. However, also in this embodiment, one of the pair of substrates on which the switching elements and the pixel electrodes are formed is referred to as the TFT substrate for the sake of convenience. Further, since color filters are also formed on the other (the substrate on which the counter electrodes are formed) of the pair of substrates, the substrate is referred to as the color filter substrate.

FIG. 11 is a plan view showing one of a plurality of pixels formed on a main surface (facing the liquid crystal layer) of the TFT substrate 11 used in the liquid crystal display device according to this embodiment, and FIG. 12 is a cross-sectional view obtained by cutting a liquid crystal display panel (including also the liquid crystal layer 15 and the color filter substrate 12) along a chain line XII–XII' in FIG. 11.

FIG. 11 shows pixels which include thin film transistors TFT each of which has a gate electrode 1a which is formed as a portion of a scanning signal line 1 shown at a lower side of the drawing, a semiconductor layer (channel layer) 4 which covers the gate electrode 1a, a drain electrode 2a which is branched from a video signal line 2 shown at a left column of the drawing, and a source electrode 6a which is formed in a spaced-apart manner from one end of the drain electrode 2a and faces one end of the drain electrode 2a on the semiconductor layer 4, and pixel electrodes 7 which are connected to the source electrodes 6a. Since the pixel electrodes 7 are arranged on the protective film 8 as shown in FIG. 12, the pixel electrode 7 is indicated by reference numeral different from (6) used in the first embodiment. While the source electrodes 6a are formed of a metal film such as a chromium thin film or an alloy film such as a molybdenum(Mo)-aluminum(Al) thin film, the pixel electrodes 7 are formed of an oxide conductive film having high optical transmissivity as represented by indium-tin-oxide (ITO) or indium-zinc-oxide (IZO). The source electrodes 6a may be formed using the same material and the same process as the video signal lines 2 and the drain electrodes 2a. Further, depending on the resistivity which is allowed to the video signal lines 2, the source electrodes 6a, the video signal lines 2 and the drain signal lines 2a may be formed of the above-mentioned oxide conductive film. Each pixel is provided with one pixel electrode 7 which is extended over a region which is surrounded by a pair of scanning signal lines 1 and a pair of video signal lines 2. On a main surface of the TFT substrate 11, a plurality of these pixels are arranged two dimensionally. One example of the mode or arrangement of a plurality of pixels is shown in FIG. 11 such that eight other pixels surround one center pixel (the eight pixels being shown partially).

On the other hand, as shown in FIG. 12, over the color filter substrate 12, the black matrix BM and the color filters CF are formed on the main surface of the substrate and a protective film 18 is formed such that the protective film 18 covers the black matrix BM and the color filters CF. The protective film 18 is formed of a silicon nitride film expressed by a chemical structural formula $Si_xN_y$ ($1.0<y/x$). In the same manner as the lower-side layer 8b of the protective film 8 formed on the TFT substrate 11 side, the undulation generated on the main surface of the substrate is alleviated due to such a thickness. This undulation implies steps (stepped portions) which are formed in the substrate thickness direction due to the formation of the scanning signal lines 1, the video signal lines 2 and the thin film transistors on the main surface of the TFT substrate 11 as well as due to the formation of the black matrix BM and the color filters CF on the main surface of the color filter substrate 12. In this embodiment, the detail of the protective film 8 formed at the TFT substrate 11 side is explained in detail later.

A counter electrode 13 is formed on the protective film 18. The counter electrode 13 is formed of an oxide conductive film having high optical transmissivity (or a transparent conductive film similar to the oxide conductive film) in the same manner as the above-mentioned pixel electrodes 7 and has an area which is capable of facing in an opposed manner a plurality of pixel electrodes 7 which are formed on the TFT substrate 11 which sandwiches liquid crystal with the counter electrode 13. That is, different from the structure of the first embodiment which mounts the counter electrode 3a on the TFT substrate 11 for each pixel, each counter electrode 13 of this embodiment is formed of one oxide conductive film or one transparent conductive film which corresponds to at least two pixels or all pixels which constitute the display screen when necessary. Since it is unnecessary to arrange the counter electrode 13 of this embodiment on the main surface of the TFT substrate 11, the counter electrode 13 is indicated by reference numeral which is different from the reference numeral (3a) used in the first embodiment. Although an orientation film 9 is formed on the counter electrode 13, the detail thereof is substantially equal to that of the orientation film 9 formed on the TFT substrate 11 which is explained in conjunction with the first embodiment and hence, the explanation thereof is omitted.

Only structural component arranged at the color filter substrate 12 side shown in FIG. 11 is a profile BMO of an opening formed in the black matrix BM. Within the profile BMO of the opening of the black matrix BM which is shown by a broken line, the color filter CF is disposed as shown in FIG. 12. The TFT substrate 11 and the color filter substrate 12 are aligned such that the projection of the profile BMO of the opening of the black matrix onto the main surface of the TFT substrate 11 falls within the profile of the pixel electrode 7. Further, by forming the openings in the black matrix BM on the color filter substrate 12, the stray entrance of light into the liquid crystal layer from the periphery of the pixel electrode 7 can be suppressed.

On the other hand, on the main surface of the TFT substrate 11, the scanning signal lines 1, the gate electrodes 1a, the video signal lines 2, the source electrodes 6a and the drain electrodes 2a are spaced apart from each other in the substrate thickness direction by way of an insulation film (gate insulation film) 5 in the same manner as the first embodiment. Between the main surface of the substrate 11 and the insulation film 5, conductive layers 1b each of which extends along the scanning signal line 1 (in the x direction in FIG. 11) and conductive layers 1c each of which is bonded to another scanning signal line 1 which is spaced apart from the conductive layer 1b by one pixel along the video signal line 2 are formed. These conductive layers 1b, 1c are, as shown in FIG. 11, overlapped to the periphery of one pixel electrode 7 together with the scanning signal line 1 which is bonded to the conductive layer 1c. Between the periphery of the pixel electrode 7 and the above-mentioned counter electrode 13, an electric field (a so-called fringe field) which is irregular compared to an electric field which is generated between the a region arranged inside the periphery of the pixel electrode 7 and the counter electrode 13 (an electric field which is suitable for controlling optical transmissivity of the liquid crystal layer) is generated. This fringe field causes leaking of light along the periphery of the pixel electrode 7 even when the potential of the pixel electrode 7 is controlled to minimize the optical transmissivity of the liquid crystal layer, for example.

To the contrary, in the so-called loop structure consisting of the above-mentioned conducive layers 1b, 1c and scanning signal lines 1, the conductive layers 1b, 1c are overlapped to the periphery of the pixel electrode 7 while sandwiching the insulation film 5 therebetween and hence, the leaking of light attributed to the fringe field can be suppressed. In view of such an advantageous effect, the conductive layers and the scanning signal line which constitute the loop structure is referred to as a light shielding film or a light shielding structure. As shown in FIG. 11, the loop structure includes a pair of conductive layers 1c which are formed at both sides of the pixel electrode 7 along the extension direction of the video signal lines 2 (y direction in FIG. 11). Further, as the scanning signal line 1 which is included in the loop structure, the scanning signal line 1 which does not contribute to the control of a switching element connected to the pixel electrode 7 to which the scanning signal line 1 is overlapped, that is, the scanning signal line 1 which contributes to the control of the switching element to which another pixel electrode 7 disposed close to the pixel electrode 7 along the video signal line 2 is connected is selected.

Accordingly, the region through which light transmits in each pixel provided to the liquid crystal display device (liquid crystal display panel) of this embodiment is restricted by the opening BMO of the black matrix which is overlapped along the periphery of the main surface of the pixel electrode 7 and the above-mentioned loop-shaped light shielding structure.

On the other hand, a semiconductor layer 4 which is formed between the above-mentioned insulation film 5 and the video signal line 2, the source electrode 6 and the drain electrode 2a in the liquid crystal display device of this embodiment extends to an end portion of the TFT substrate 11 along the video signal line 2, while within the profile in the main surface of the TFT substrate 11, the above-mentioned video signal line 2, the source electrode 6a and the drain electrode 2a are accommodated. Such a planar shape of the semiconductor layer 4 is attributed to etching of the semiconductor layer 4 using the molded video signal line 2, the source electrode 6a and the drain electrode 2a as masks. Such a shape of the semiconductor 4 is suitable for preventing the disconnection of the video signal lines 2 or the disconnection of the conductive film when the conductive film (for example, the pixel electrode 7) which is formed on the protective film 8 described later is connected to the video signal line 2, the source electrode 6a or the drain electrode 2a through the opening formed in the protective film.

Also in the liquid crystal display device of this embodiment, the bottom-gate type thin film transistors are used as switching elements and the protective film 8 is formed such that the protective film 8 covers these components. Accordingly, although there lies some difference between this embodiment and the first embodiment with respect to the step 7 of the first embodiment, the TFT substrate according to this embodiment is manufactured by substantially following step 1 to step 8. However, to form the pixel electrode 7 over the protective film, following steps are added between the step 8 and the step 9 of the first embodiment.

Step 8-1: A photo resist is formed on the protective film 8 and the protective film 8 which is positioned above a portion of the source electrode 6a to which the pixel electrode 7 which will be explained later is electrically connected is partially exposed by a photolithography method and then is removed by developing. Accordingly, over one portion of the source electrode 6a, an opening of the photo resist is formed. Then, the protective film 8 which is exposed through the opening of the photo resist is etched so as to form a through hole which allows a portion of the source electrode 6a to be exposed.

Step 8-2: The photo resist formed in step 8-1 is removed using chemicals.

Step 8-3: A transparent conductive film having a film thickness of 150 nm which is made of indium oxide ($In_2O_3$) and tin oxide ($SnO_2$) is formed on the protective film 8 using a sputtering method. The transparent conductive film is also formed on inner walls of openings formed in the protective film in step 8-1 and is brought into contact with portions of the source electrodes 6a at bottom portion thereof. Thereafter, a photo resist is applied to the transparent conductive film.

Step 8-4: The photo resist formed in step 8-3 is exposed using a photo mask having a light shielding pattern corresponding to the arrangement of the pixel electrodes 7 in the main surface of the substrate 11, and the photo resist other than the photo resist where the pixel electrodes 7 are formed is removed by developing. Subsequently, the transparent conductive film which is not covered with the photo resist is etched so as to remove the transparent conductive film between the pixel electrodes 7 as shown in FIG. 11 and FIG. 12. Finally, the photo resist remaining on the pixel electrodes 7 is removed using the chemicals.

At a stage that step 8-4 is completed, a step corresponding to step 9 in the first embodiment is started. Accordingly, in this embodiment, the orientation film 9 is formed over the protective film 8 and the pixel electrodes 7 which are formed over the protective film 8.

In this embodiment, as shown in FIG. 12, the protective film 8 is formed by laminating material layers 8a, 8b, 8c in three layers from the switching elements in the reverse order. All of three layers are made of silicon nitride material expressed by a chemical structural formula $Si_xN_yX_z$, (X being a general term of other constitutional element, all three layers satisfying y/x>0). It is not exaggerating to mention that all of three layers are made of material containing silicon (Si) and nitrogen (Ni) as main constitutional elements.

Here, the material layer 8a corresponds to the upper-side layer (the silicon nitride film 8a in the first embodiment) of the above-mentioned protective film structure according to the present invention and the material layer 8b corresponds to the lower-side layer (the silicon nitride film 8b in the first embodiment) of the protective film structure. The material layer 8c is served for controlling the etching condition of the protective film 8 in the above-mentioned step 8-1 so as to form inner walls of the openings formed above the source electrodes 6a into proper inclined faces. The material layer 8c is made thin compared to the material layer 8b and is a so-called Si-rich layer which exhibits the composition ratio (y/x) of nitrogen/silicon lower than that of the material layer 8b. To compare the material layer 8a with the material layer 8c, it is preferable to set the thickness of the material layer 8c to a value not more than the thickness of the material layer 8a. Further, it is preferable to set the composition ratio (y/x) of nitrogen/silicon of the material layer 8c to a value not less than that of the material layer 8a. However, with respect to the relationship between the material layer 8a and the material layer 8c, even when these recommended conditions relating to the thickness and the composition are not taken into account, the exercise of the present invention is not obstructed.

As shown in FIG. 12, the material layer 8c is connected to the drain electrode 2a and the source electrode 6a which are spaced apart from each other respectively and strides over a groove (reaching the semiconductor layer 4) which separates these electrodes. However, it is not exaggerating to mention that the short-circuiting of the drain electrode 2a and the source electrode 6a through the material layer 8c can be ignored. The reason is that the resistivity of the material layer 8c is sufficiently high compared to the resistivity of the semiconductor layer 4 (an intrinsic semiconductor layer which constitutes a channel of a thin film transistor) which the groove separating the drain electrode 2a and the source electrode 6a reaches and the electric resistance of portions of the material layer 8c which come into contact with these electrodes 2a, 6a is sufficiently high. Accordingly, unless the transitional metal having the high conductive property is remarkably increased as constitutional elements of the above-mentioned chemical structural formula $Si_xN_yX_z$ other than silicon and nitrogen compared to the amounts of silicon and nitrogen, the drain electrode 2a and the source electrode 6a can be substantially electrically separated by the material layer 8c.

On the other hand, on the material layer 8a which exhibits the low resistivity compared to the resistivity of the material layer 8b, the pixel electrodes 7 which are formed of a transparent conductive film made of indium-tin-oxide (ITO) or indium-zinc-oxide (IZO) are formed. Accordingly, the transparent conductive film which constitutes respective pixel electrodes 7 is separated by etching for every pixel in the above-mentioned step 8-4 and hence, it appears that these pixels 7 are made conductive with each other through the material layer 8a which exhibits the remarkable photo conduction compared to the conventional protective film such as the material layer 8b. However, although the resistivity of the material layer 8a is lower than the resistivity of the material layer 8b, to re-distribute the charge distributed among respective pixel electrodes 7 in response to the image display operation of the liquid crystal display device, the resistivity is held at a high value. This can be understood from the fact that the resistivity is set to $1.7–3.0\times10^4$ $\Omega$cm in an example in which the pixel electrodes 7 are made of indium-tin-oxide. Accordingly, when the pixel electrodes 7 exhibit the resistivity comparable to the resistivity of metal, that is, $1\times10^3$ $\Omega$cm, the electric short-circuiting between the pixels 7 through the material layer 8a during the image display operation can be ignored.

On the other hand, particularly at a point of time that the image display operation of the liquid crystal display device is completed, the material layer 8a exhibits a unique effect. That is, at a point of time that the image display operation of the liquid crystal display device is completed, applying of scanning signals to the switching elements (thin film transistors in this embodiment) provided to respective pixels is terminated. Accordingly, the charge which corresponds to the video signal taken in immediately before the completion of the image display operation remains in the pixel electrodes 7. Although efforts have been made to erase the image retention from the display screen of the liquid crystal display device by removing the residual charge from the pixel electrodes 7 from a viewpoint of driving method of the liquid crystal display device. However, the sufficient effects have not been obtained. To the contrary, by bonding the material layer 8a which exhibits the resistivity lower than that of the conventional protective film and the pixel electrode 7, it is possible to release at least a portion of the residual charge in the inside of the pixel electrode 7 to the material layer 8a.

The advantageous effect of this material layer 8a can be explained as follows in view of the comparison of the material layer 8a with the conventional protective film. In the conventional protective film, the resistivity of the protective film is too high to release the residual charge from the pixel electrode 7. As a result, the residual charge of the pixel electrode 7 is discharged from the pixel electrode 7 such that the residual charge is gradually leaked to the video signal line 2 through the channel of the switching element. Accordingly, even after the completion of the image display operation of the liquid crystal display device, a considerable amount of charge remains in the pixel electrode 7 for a long time and hence, the image retention of a level which makes a user of the liquid crystal display device recognize the image retention is displayed on the display screen. To the contrary, even assuming that the material layer 8a of this embodiment cannot discharge the charge from the surface which faces the liquid crystal layer of the liquid crystal display panel in an opposed manner in a short time, the fact that the state that the charge which is locally held in the specific pixel electrode 7 can be solved in a short time is apparent from the above-mentioned explanation that the weak conductive state between the pixel electrode 7 and the material layer 8a allows the release of the residual charge in the inside of the pixel electrode 7 to the material layer 8a. That is, considering that the difference in the residual charge amount among the pixel electrodes 7 of the liquid crystal display device makes the user recognize the image retention on the display screen, it is appreciated that the leaking of the residual charge in the pixel electrodes 7 to the material layer 8a in the liquid crystal display device of this embodiment narrows the difference in the residual charge amount among the pixel electrodes 7 and hence, it is possible to obtain the advantageous effect that the image retention on the display screen can be suppressed.

Figure 13A:
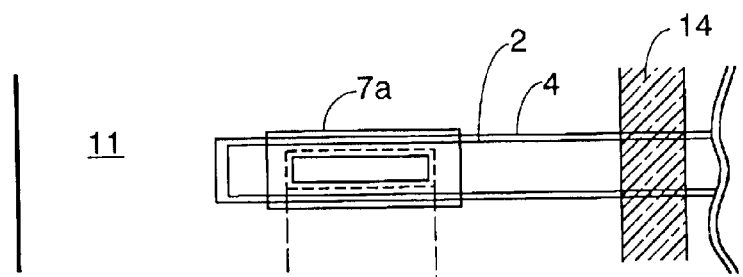
FIG. 13A is a plan view showing a planar structure and FIG. 13B is a cross-sectional view taken along a line B–B' in FIG. 13A.
Figure 13B:
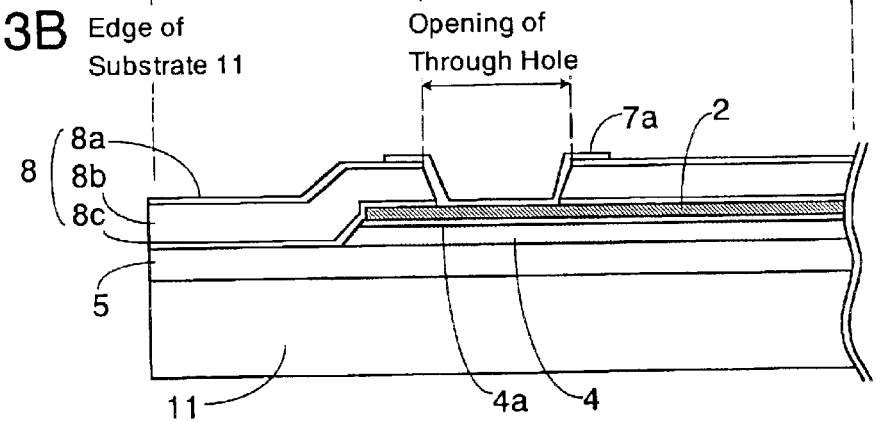

With respect to the liquid crystal display device according to this embodiment, as an example of the structure which is desirable for discharging the residual charge from the pixel electrode through the above-mentioned material layer 8a, FIG. 13 shows an improved video signal line terminal. The video signal line 2 shown in FIG. 11 extends to an end portion of the TFT substrate 11 together with the semiconductor layer 4 (also including the semiconductor layer 4a) disposed below the video signal lines 2 and forms a terminal (the video signal line terminal) shown in FIG. 13 at a place outside the sealing material 14 (see FIG. 4). FIG. 13A is a plan view which shows one planar structure of the terminal in an enlarged manner and FIG. 13B is a cross-sectional view taken along a line B–B' in FIG. 13A (however, only the TFT substrate 11 and the laminated structure on the TFT substrate 11 shown).

Figure 15:
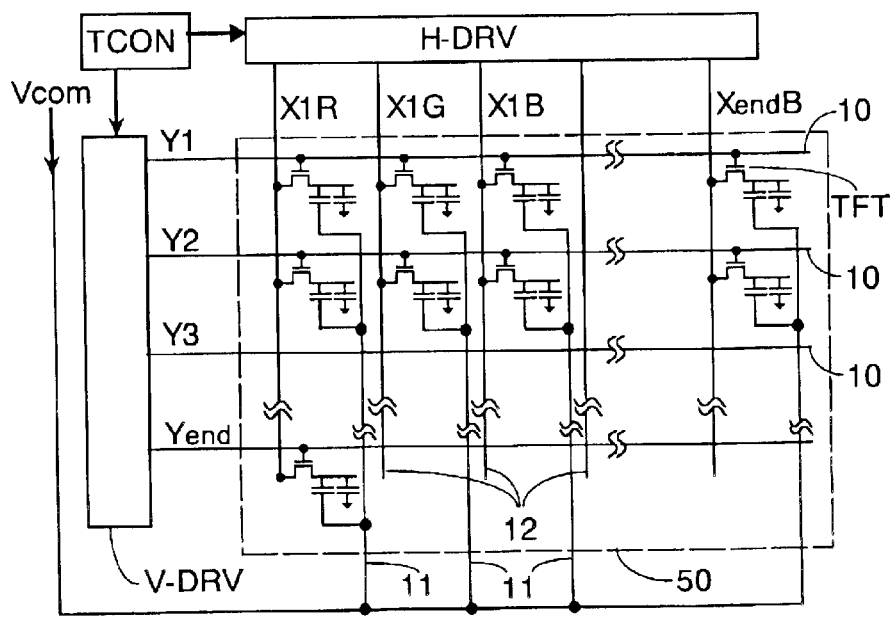
FIG. 15 is an equivalent circuit diagram of the liquid crystal display device using thin film transistors.

With respect to this video signal line terminal, an opening which reaches the video signal line 2 from the uppermost surface of the protective film 8 prepared in the above-mentioned step 8 is formed together with the opening which reaches the source electrode 6a from the uppermost surface of the protective film 8 in the above-mentioned steps 8-1 and 8-2. Subsequently, the transparent conductive film 7a which extends to the uppermost surface of the protective film 8 from a bottom portion of the opening is formed together with the above-mentioned pixel electrode 7 in the above-mentioned steps 8-3 and 8-4. Accordingly, the transparent conductive film 7a which is formed in the opening or the through hole shown in FIG. 13A and FIG. 13B constitutes the terminal which receives video signals to be supplied to the video signal line 2. To this terminal, the output terminal of the video signal driving circuit H-DRV shown in FIG. 15 is electrically connected directly or through a flexible printed circuit board.

Compared to a case in which the transparent conductive film 7a is not formed in the opening shown in FIG. 13A and FIG. 13B and an output from the video signal driving circuit H-DRV is connected to the video signal line 2 exposed through the opening, in this terminal structure which forms the transparent conductive film 7a in the opening, it is possible to increase the area of the electric connection with the electrode of the semiconductor device which constitutes the video signal driving circuit or the terminal of the line which transmits the output signal from the semiconductor device, and it is also possible to prevent the corrosion of the conductive layer of the video signal line 2 in the atmosphere of the liquid crystal display panel.

In this embodiment, since the transparent conductive film 7a also comes into contact with the material layer 8a which constitutes the protective film 8, the residual charge of the pixel electrode 7 which leaks to the material layer 8a in the above-mentioned manner can be released to the external circuit of the liquid crystal display panel (video signal driving circuit in the case shown in FIG. 13) through the terminal. Even when another material layer having resistivity higher than the resistivity of the material layer 8a is formed on the material layer 8a, the material layer 8a and the transparent conductive film 7a are brought into contact with each other in the inner wall of the opening (the inclined surface shown in FIG. 13A) and hence, the above-mentioned advantageous effect is not damaged. However, when this another material layer exhibits the insulation property similar to the insulation property of the material layer 8b, it is preferable to make the thickness of another material layer smaller than the thickness of the material layer 8a so as to generate a tunneling current between the material layer 8a and the pixel electrode 7. When such a terminal structure is provided as a terminal which applies the reference potential or the ground potential to the TFT substrate or a desired portion (for example, the common electrode 13 provided to the color filter substrate 12) of the liquid crystal display panel through the TFT substrate 11, the advantageous effect is further enhanced. Here, in view of the above-mentioned explanation that the image display operation is not damaged even when the pixel electrode 7 is brought into contact with the material layer 8a, it is apparent that such a terminal structure does not obstruct the supply of signals from the video signal driving circuit H-DRV to the video signal line 2. Further, by forming an opening which reaches the scanning signal line 1 from the uppermost surface of the protective film 8 through the insulation film 5 and then by providing a scanning signal line terminal formed of the transparent conductive film which extends to the uppermost surface of the protective film 8 from the bottom portion of the opening, it is possible to obtain the same advantageous effects as the above-mentioned video signal line terminal.

The terminal structure shown in FIG. 13A and FIG. 13B is applicable to the in-plane-switching type liquid crystal display device which is explained in the first embodiment. In this case, it is preferable to perform the above-mentioned steps 8-1 to 8-4 after the above-mentioned step 9. Further, in step for forming the opening in the protective film 8 using the photolithography, it is preferable to apply the photo resist to the upper surface of the protective film 8 while covering the substantially entire area of the main surface of the TFT substrate 11. However, it is possible to limit the exposure and developing of the photo resist to a peripheral portion of the TFT substrate 11.

Here, the transparent conductive film described in this specification indicates, for the sake of convenience, a conductive film which has the optical transmissivity sufficient to propagate light irradiated from the liquid crystal layer to the substrate made of material having high optical transmissivity such as glass or plastic. Here, the transparent conductive film does not exclude the conductive film which has property to absorb light incident on the conductive film. Further, in this embodiment, although the substrate which faces the TFT substrate in an opposed manner is referred to as the color filter substrate, the exercise of the present invention is not obstructed even when the color filters are formed on the pixel electrodes 7 using a technique such as electrodeposition. In such an embodiment, the color filter substrate is replaced with the term "the counter substrate which faces the TFT substrate in an opposed manner". Further, even when the thin film transistors which are used as the switching elements in this embodiment are replaced with diodes adopting the MIM (Metal-Insulator-Metal) type laminating structure, the exercise of the present invention is not obstructed. To include such a case, it is possible to replace the above-mentioned term "TFT substrate (substrate provided with the switching elements)" with the term "the first substrate" and to replace the above-mentioned term "the substrate which faces the TFT substrate in an opposed manner (the color filter substrate in this embodiment)" with the term "the second substrate".

<<Third Embodiment>>

Figure 14:
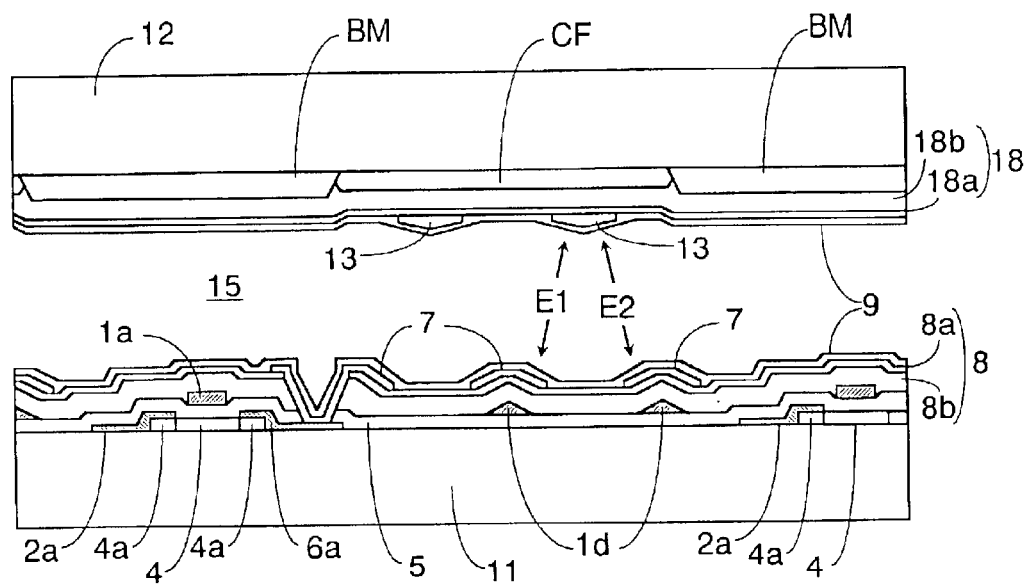
FIG. 14 is a cross-sectional view of the pixel and the vicinity of the pixel formed in a VA type liquid crystal display device (liquid crystal display panel) according to the third embodiment of the present invention.

As the third embodiment of the liquid crystal display device of the present invention, a case in which the above-mentioned protective film is adopted by the vertically aligned type (also referred to as VA type) liquid crystal display device is explained in conjunction with FIG. 14 which is a cross-sectional view.

Since the detail of the VA type liquid crystal display device is explained in Japanese Laid-open Patent Publication 122065/2000, for example, the explanation relating to the orientation mode of liquid crystal molecules and the behavior of the liquid crystal molecules in response to an electric field which features the VA type liquid crystal display device is omitted. Only the pixel structure which features the VA type liquid crystal display device is explained hereinafter.

In the VA type liquid crystal display device, switching elements and pixel electrodes 7 which are connected to the switching elements are formed on a main surface of the first substrate 11 and counter electrodes 13 which form electric fields in a liquid crystal layer 15 together with the pixel electrodes 7 are formed on a main surface of the second substrate 12 (facing the first substrate 11 in an opposed manner while sandwiching the liquid crystal layer 15 therebetween). Such a structure is substantially in common with the structure of the TN type liquid crystal display device of the above-mentioned second embodiment. However, the VA type liquid crystal display device is characterized in that at least one of the pixel electrode 7 and the counter electrode 13 is constituted of a plurality of conductive layers which are spaced apart from each other within the pixel (portion which faces the color filter CF in FIG. 14) or at least two kinds of inclined faces are formed on the main surface at the liquid-crystal-layer 15 side. Such an electrode structure generates at least two kinds of electric fields which differ in the electric field applying direction with respect to the liquid crystal layer 15 in one pixel. As one of the features of the VA type liquid crystal display device, it is pointed out that at least one electrodes out of the pixel electrodes and the counter electrodes include portions where one electrodes do not face the other electrodes within the main surface of the substrate in the inside of the pixels (for example, openings formed in a black matrix or regions defined by profiles of the color filter layers).

In this embodiment, as shown in FIG. 14, each pixel electrode 7 and each counter electrode 13 are respectively divided into portions within the pixel. Respective divided portions of the pixel electrode 7 and the counter electrode 13 are made conductive to each other at the periphery of the pixel in the same manner as the pixel electrode 6 and the counter electrode 3*a* of the in-plane-switching type liquid crystal display device shown in FIG. 1. Further, two kinds of inclined faces which differ in the inclination with respect to the main surface of the so-called first substrate 11, that is, the first inclined face directed in the right upward direction and the second inclined face directed in the left upward direction are formed on each portion of the pixel electrode 7. On the other hand, two kinds of inclined faces which differ in the inclination with respect to the main surface of the so-called second substrate 12, that is, the first inclined face directed in the left downward direction and the second inclined face directed in the right downward direction are formed on each portion of the counter electrode 13. The respective portions of the pixel electrode 7 and the respective portions of the counter electrode 13 are arranged such that the first inclined face of the former faces the first inclined face of the latter while sandwiching the liquid crystal layer therebetween and the second inclined face of the former faces the second inclined face of the latter while sandwiching the liquid crystal layer therebetween. Due to such a constitution, an electric field E1 is generated between the first inclined face of the pixel electrode 7 and the first inclined face of the counter electrode 13 due to applying of a signal voltage to the pixel electrode 7, while an electric field E2 is generated between the second inclined face of the pixel electrode 7 and the second inclined face of the counter electrode 13 due to applying of a signal voltage to the pixel electrode 7. However, the behavior (displacement of orientation direction) of liquid crystal molecules due to the electric field E1 and the behavior of liquid crystal molecules due to the electric field E2 appear to be different from each other at the side (upper side in FIG. 14) from which the display image on the liquid crystal display panel is observed. That is, with respect to the video signal supplied to one pixel, the different orientation states of liquid crystal molecules are present in the pixel. Here, it has been reported that by removing at least one or both of the orientation films 9 on the first substrate side and the second substrate side shown in FIG. 4, the liquid crystal molecules can be oriented as mentioned above.

As a problem attributed to the image display by the liquid crystal display device, the reduction of contrast corresponding to the increase of an angle with respect to the normal direction of the display screen (a so-called viewing angle) is named. This is attributed to a phenomenon that the intensity of light irradiated from a certain pixel through the liquid crystal layer is deviated from a desired value due to the increase of the viewing angle. However, with respect to the pixel of this embodiment, even when the intensity of light which the liquid crystal molecules oriented by the electric field E1 propagates is deviated corresponding to the viewing angle, the deviation is compensated by the intensity of light which the liquid crystal molecules orientated by the electric field E2 propagates so as to prevent the reduction of contrast. Alternatively, with respect to the pixel of this embodiment, the reverse compensation may be performed so as to prevent the reduction of contrast.

The TFT substrate of this embodiment adopts the thin film transistors having the top gate structure. The feature of the top gate structure lies in the structure that the gate electrode 1*a* is arranged on the semiconductor layer 4 which constitutes the channel of the thin film transistor with respect to the main surface of the first substrate 11. Compared to the structure of the thin film transistors illustrated in the first embodiment and the second embodiment, the arrangement of the gate electrode 1*a*, the source electrode 6*a* and the drain electrode 2*a* is reversed while sandwiching the insulation film 5 between them. The top gate structure adopted by this embodiment is suitable for a case in which the semiconductor layer 4 has to be produced at the time of starting the processing step of the first substrate different from other wiring layer. For example, it is preferable to apply annealing to the amorphous semiconductor layer 4 by laser irradiation so as to turn the semiconductor layer 4 into a state close to a poly-crystalline state or or a single crystal state. In the liquid crystal display device of this embodiment, there exists no problem in changing the thin film transistors into the bottom gate structure as shown in the first embodiment and the second embodiment.

To form the above-mentioned inclined faces on the upper surface of the pixel electrode 7, holding capacitance electrodes 1*d* are formed onto the insulation film 5 together with the gate electrodes 1*a* and inclinations are provided to the upper surface of the insulation film 5 by properly selecting etchants. The protective film 8 is formed on the insulation film 5 such that the protective film 8 covers the gate electrodes 1*a* and the holding capacitance electrodes 1*d*. Openings which reach the upper surfaces of the source electrodes 6*a* of the thin film transistors are formed in the protective film 8. The pixel electrodes 7 are formed such that the transparent conductive film extends to an upper surface of the protective film 8 from the source electrodes 6 disposed at bottom portions of the openings. The material layers 8*a*, 8*b* which constitute the protective film 8 of this embodiment are respectively formed substantially in the same manner as the material layers 8*a*, 8*b* of the second embodiment and, at the same time, the pixel electrodes 7 are formed substantially in the same manner as the pixel electrodes of the second embodiment. Further, the protective film 8 of this embodiment can also obtain the advantageous effects similar to those described in the second embodiment. Still further, by forming the scanning signal line terminals of this embodiment as shown in FIG. 13A and FIG. 13B, the above-mentioned advantageous effects become remarkable.

On the other hand, also on the second substrate of this embodiment, the protective film 18 which is formed by laminating material layers 18*a*, 18*b* having compositions equal to those of the material layers 8*a*, 8*b* formed on the first substrate is formed. On an upper surface (a lower layer in FIG. 14) of the material layer 18*a* which exhibits the lower resistivity compared with the material layer 18*b*, the counter electrodes 13 made of a transparent conductive film similar to the above-mentioned pixel electrodes 7 are formed. In forming the inclined faces on upper surfaces (lower surfaces in FIG. 14) of the counter electrodes 13, taking into an account the fact that light is propagated from the liquid crystal layer 15 to the second substrate 12 side, the formation of the metal films or alloy films having a triangular shape such as the above-mentioned holding capacitance electrodes id as background films is obviated. In place of the formation of such metal films or alloy films, the counter electrodes 13 are patterned respectively by etching the transparent conductive film and, thereafter, the inclined faces are formed by further etching the transparent conductive film after changing the etching conditions.

Also when the counter electrodes 13 are formed in a spaced-apart manner from each other on the second substrate 12 as in the case of this embodiment, it is preferable to adopt the protective film 18 (also referred to as an overcoat film) according to the present invention. Particularly, in the common inversion driving in which the potential of the counter electrodes of the liquid crystal display device is changed every frame or every time a given number of scanning signal lines 2 are operated, it is possible that the residual charge amount differ between the counter electrodes 13 also at the second substrate 12 side. Accordingly, in erasing the image retention, it is important to discharge the residual charge from each counter electrode 13 and to eliminate the potential difference which is generated between the counter electrodes 13. In this manner, the formation of the protective film 18 according to the present invention onto the second substrate which faces the first substrate on which the switching elements are formed in an opposed manner brings about the image retention reduction effect when each counter electrode 13 is divided in response to a group of pixels even in the TN type liquid crystal display device described in the second embodiment.

Although the liquid crystal display devices which adopt the protective film structure of the present invention have been explained heretofore in conjunction with the first to third embodiments, the scope to which the protective film structure is applicable is not limited to the disclosure of the embodiments. Further, the novel protective film which exhibits the low resistivity and is formed at a position close to the liquid crystal layer side is not always referred to as the silicon nitride layer or the material layer as mentioned above in response to the mode for carrying out the present invention. That is, the novel protective film may be referred to other terms. For example, in the step in which the above-mentioned material layer 8*b* and the material layer 8*a* are laminated to the main surface of the substrate in this order, the former may be also referred to as the first protective film layer (8*b*) and the latter may be also referred to as the second protective film layer (8*a*).

The liquid crystal display devices of the present invention which have been described heretofore bring about following advantageous effects with respect to the liquid crystal display panel as a single body as well as the whole liquid crystal display module product in which the liquid crystal display panel is incorporated.

First of all, since the characteristics to alleviate the image retention which is generated on the display screen of the liquid crystal display device is enhanced, it is possible to provide the liquid crystal display device and the liquid crystal display module which exhibit the excellent image display quality.

Secondly, the above-mentioned liquid crystal display device (liquid crystal display panel) which exhibits the excellent image display quality can be manufactured by only controlling the film forming conditions using the existing vapor deposition apparatus without introducing new manufacturing device. Accordingly, the mass production process conditions can be easily determined. Further, the manufacturing yield rate of the liquid crystal display device and the liquid crystal display module which incorporates the liquid crystal display device therein can be maintained at a high level.

Thirdly, it becomes no more necessary to make the driving method of the liquid crystal display device complicated for erasing the image retention and hence, the driving circuits mounted in the liquid crystal display panel can be simplified and miniaturized.

Fourthly, irrespective of the configuration of the backlight, the side light (edge light) and the front light, in the liquid crystal display panel which incorporates the light source therein, the photo conduction (photo conductive phenomenon) is generated on the surface of (or in the vicinity of) the above-mentioned protective film according to the present invention due to light irradiated from the light source. Accordingly, it is possible to instantly erase the image retention from the display screen.

What is claimed is:

1. A liquid crystal display device, comprising:
   a pair of substrates being arranged opposite to each other; and
   a liquid crystal layer being interposed between main surfaces of the pair of substrates,
   wherein pixel regions each of which includes a switching element and a pixel electrode connected to the switching element and a protective film including a plurality of material layers laminated at the liquid crystal layer side of the switching elements are formed on a main surface of one of the pair of substrates facing the liquid crystal layer,
   the plurality of material layers include at least a first material silicon nitride layer and a second material layer which is arranged closer to the liquid crystal layer side than the first layer,
   the second material layer exhibits resistivity which is lower than resistivity of the first material layer and higher than resistivity of silicon, and
   each of the first and second material layers contains silicon and nitride, and the second material layer has a smaller composition ratio of nitrogen to silicon than the first material layer.

2. A liquid crystal display device according to claim 1, wherein the resistivity of the second material layer is set to a value lower than 1/100 of the resistivity of the first material layer.

3. A liquid crystal display device according to claim 1, wherein the resistivity of the second material layer is lower than the resistivity of the liquid crystal layer.

4. A liquid crystal display device according to claim 1, wherein the pixel electrodes are provided at a side opposite to the liquid crystal layer with respect to the protective film.

5. A liquid crystal display device according to claim 1, wherein the pixel electrodes are provided between the protective film and the liquid crystal layer.

6. A liquid crystal display device according to claim 1, wherein an orientation film is formed on the liquid crystal layer side of the protective film.

7. A liquid crystal display device according to claim 1, wherein the liquid crystal layer is sealed in a space which is surrounded by a sealing material which is provided between the pair of substrates, signal lines which are connected to the switching elements are formed on the main surface of one of the pair of substrates such that the signal lines extend to the outside from the space, and the second material layer is brought into contact with a terminal which electrically connects the signal lines and an external circuit at the outside of the space.

8. A liquid crystal display device according to claim 1, wherein a thickness of the second material layer is not more than ½ of a thickness of the protective film.

9. A liquid crystal display device according to claim 8, wherein the thickness of the second material layer is not less than 10 nm.

\* \* \* \* \*